United States Patent [19]

Mertinooke et al.

[11] Patent Number: 5,192,586
[45] Date of Patent: Mar. 9, 1993

[54] METHOD AND APPARATUS FOR COATING A SUBSTRATE WITH A LIQUID RESIN

[75] Inventors: Peter E. Mertinooke, Amesbury; Louis Halberstadt, Andover; Dan C. Muessel, Danvers, all of Mass.; Joseph V. Perry, Chester, N.H.

[73] Assignee: Amesbury Industries, Inc., Amesbury, Mass.

[21] Appl. No.: 650,974

[22] Filed: Feb. 1, 1991

Related U.S. Application Data

[63] Continuation of Ser. No. 270,778, Nov. 14, 1988, abandoned.

[51] Int. Cl.$^5$ .......................... B05D 5/08; B05D 1/26; B05D 3/12; B05C 3/15
[52] U.S. Cl. ..................................... 427/210; 427/209; 427/235; 427/261; 427/286; 427/358; 118/405; 118/408; 118/410; 118/411
[58] Field of Search ............... 118/405, 410, 411, 412, 118/408; 427/244, 261, 286, 356, 358, 209, 210, 235; 428/319.7, 319.9

[56] References Cited

U.S. PATENT DOCUMENTS

| | | | |
|---|---|---|---|
| 3,081,213 | 3/1963 | Chinn | 118/405 X |
| 4,259,379 | 3/1981 | Britton et al. | 118/405 X |
| 4,263,348 | 4/1981 | Renegar | 118/412 X |
| 4,476,165 | 10/1984 | McIntyre | 427/258 |
| 4,687,137 | 8/1987 | Boger et al. | 118/411 X |

FOREIGN PATENT DOCUMENTS

| | | |
|---|---|---|
| 0260674A2 | 3/1988 | European Pat. Off. . |
| 1595214 | 8/1981 | Sweden . |
| 1305808 | 2/1973 | United Kingdom ............. 428/319.9 |
| 2067104A | 7/1981 | United Kingdom . |
| 2132509A | 7/1984 | United Kingdom . |
| 2179270A | 3/1987 | United Kingdom . |

*Primary Examiner*—Evan Lawrence
*Attorney, Agent, or Firm*—Testa, Hurwitz & Thibeault

[57] ABSTRACT

A method and apparatus of applying a coating to a substrate is provided. A liquid resin is introduced into a first region at a predetermined pressure. The liquid resin is maintained within a first pressure range in the first region. Next, the flow of the resin from the first region to a second region is controlled so as to bring the resin from the first pressure range to a second pressure range, the pressures in the second pressure range being lower than the pressures in the first pressure range. The liquid resin is then applied at a pressure within the second pressure range to the substrate at a third region adjacent the second region.

40 Claims, 10 Drawing Sheets

METHOD AND APPARATUS FOR COATING A SUBSTRATE WITH A LIQUID RESIN

This application is a continuation of application Ser. No. 07/270,778, filed Nov. 14, 1988, now abandoned.

BACKGROUND OF THE INVENTION

The present invention generally relates to a method and apparatus for coating a substrate with a liquid resin, and, more particularly, to a method and apparatus for coating selected portions of a rigid or non-rigid substrate with predetermined thicknesses of a liquid resin to form an outer layer for the substrate.

In many applications, it is desirable to provide a relatively thin, outer layer or skin for a substrate. Substrate as used herein will broadly refer to an underlying structure or part, both rigid and nonrigid. The substrate may include a plurality of components, some rigid and some nonrigid. The layer or skin may perform a variety of functions such as protecting the substrate from adverse external conditions, providing the external surface of the substrate or portions thereof with characteristics suitable for particular applications, providing an aesthetically appealing finished product, and the like. The outer layer or skin may also improve the tear resistance of the substrate and enhance overall strength providing a more durable and rugged finished product. A conducting wire surrounded by an insulating layer is one example of a substrate having an outer layer performing such functions. Another substrate which may include an outer layer or skin is a weatherseal. The present invention will be discussed below in terms of a weatherseal. However, the method and apparatus of the present invention are not limited in this respect. The present invention is broadly applicable where it is desired to provide an outer layer or skin for rigid and non-rigid substrates including, but not limited to, foams, metals, and extrudable plastics.

In general, weatherseals seal joints or spaces between doors and windows so as to inhibit infiltration of air, rain, snow, and other elements. Effective weatherseals can reduce both heating costs in winter and cooling costs in summer. Certain characteristics are necessary to produce an effective weatherseal. First, a weatherseal should have good compression set resistance. Compression set resistance refers to the ability of a material to resume its initial shape after being subjected to a compressive load. Failure to resume this initial shape may result in an uneven seal and reduce the effectiveness of the weatherseal. Second, a weatherseal should be soft and yielding, i.e., it should be easily compressible and conform to irregular surfaces. The gaps in doors, windows and the like in which weatherseals are utilized differ in size due to construction and a good weatherseal should have sufficient compressibility to conform to a wide range of gap sizes. Compressibility also ensures that a door or window, for example, can be closed without excessive force and still compress the weatherseal sufficiently to form the necessary seal.

The prior art discloses many materials which are utilized as weatherseals. U.S. Pat. Nos. 4,328,273 and 4,185,416 disclose the use of urethane foams for a weatherseal. Commonly assigned co-pending Application Ser. No. 121,805, incorporated herein by reference, discloses the use of a low density foamed thermoplastic elastomer for a weatherseal. However, these and similar materials generally have high coefficients of friction and may be easily damaged. Thus, their effectiveness and utility as a weatherseal is reduced. These problems are magnified where the weatherseal is subjected to sliding contact or other abrasive forces, as in the aforementioned U.S. patents.

In order to alleviate these problems, an outer layer or skin is typically provided for the weatherseal. The outer layer generally has a low coefficient of friction relative to the surface of contact to facilitate relative motion and is flexible to permit compression of the underlying seal. The outer layer also protects the seal from rips and tears caused by sliding contact or other abrasive forces. Low friction materials such as polyethylene copolymers, polyvinylchloride, and polypropylene copolymers have been utilized in the prior art for this outer layer.

However, there are several disadvantages associated with providing these low friction outer layers. Attaching the outer layer to the underlying seal may require a separate manufacturing step and increase the labor required to make the seal. This increases labor costs. If the outer layer is applied as a crosshead extrusion to the weatherseal, orientation of the outer layer during "draw-down" onto the seal creates low resistance to tears along the length of the seal. Thus, an initially small tear in the outer layer can propagate into a much larger tear, adversely affecting the effectiveness and utility of the weatherseal. Additionally, crosshead extrusion apparatus generally requires complex arrangments of equipment and expensive dies. These factors also increase production costs.

One prior art technique provides an outer skin for a substrate by melting a resin and placing the melted resin in a tank or pool with an entrance opening and an exit opening. The substrate is then pulled or dragged through the melted resin. The exit opening serves as a doctor blade to configure the outer layer. However, it is difficult to precisely control the thickness of the outer layer or to selectively coat portions of the substrate utilizing this prior art technique. Also, it is difficult to provide an outer layer of varying thickness. Finally, the pressure and drag exerted on a non-rigid substrate such as a foam by a viscous melted resin deforms and stretches the non-rigid substrate and generates a low quality product.

SUMMARY OF THE INVENTION

Accordingly, it is an object of the present invention to provide a method and apparatus for coating a substrate which is simple and relatively low in cost.

It is another object of the present invention to provide a method and apparatus for coating a substrate which produces a less oriented outer layer.

It is still another object of the present invention to provide a method and apparatus for producing a substrate having a multiple-component outer layer.

It is still another object of the present invention to provide a method and apparatus for providing a substrate with an outer layer of varying thickness which may be selectively applied to portions of the substrate.

It is still another object of the present invention to overcome the disadvantages of the prior art.

In accordance with the present invention, a method of applying a coating to a substrate is provided. A liquid resin is introduced into a first region at a predetermined pressure. The liquid resin is maintained within a first pressure range in the first region. Next, the flow of the resin from the first region to a second region is controlled so as to bring the resin from the first pressure range to a second pressure range, the pressures in the second pressure range being lower than the pressures in the first pressure range. The liquid resin is then applied at a pressure within the second pressure range to the substrate at a space adjacent the second region.

The present invention also provides a die for coating the substrate. The die includes a first region, means for admitting a liquid resin to the first region, and means for maintaining the first region within a first pressure range. The die also includes a second region and means for controlling the flow of the liquid resin from the first region to the second region so as to bring the liquid resin from the first pressure range to a second pressure range, the pressures in the second pressure range being lower than the pressures in the first pressure range. A die opening is provided adjacent the second region for applying said liquid resin at a pressure within the second pressure range to the substrate.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings, wherein.

DETAILED DESCRIPTION OF THE PREFERRED EMBODIMENT

Figure 1:
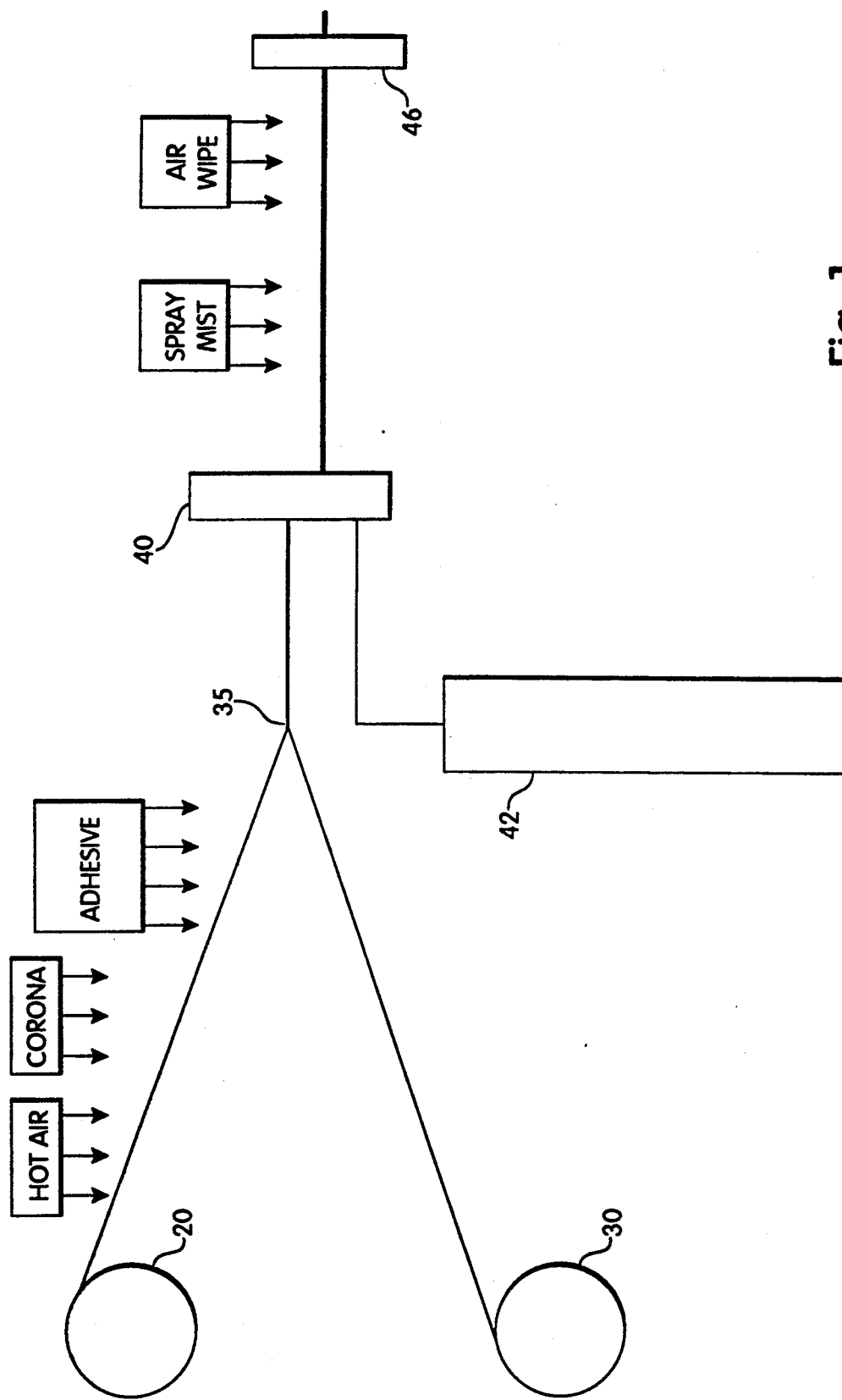
FIG. 1 is a block diagram illustrating the overall operation of one embodiment the present invention.

FIG. 1 schematically illustrates the overall operation of the preferred embodiment of the present invention. The product produced in this process is a weatherseal of the type shown in FIG. 4 which comprises a foam body with a thin skin and having bonded thereto a stiffener which is used to attach the weatherseal to a structure such as a door or window jamb. The stiffener is supplied from reel 20. The stiffener is first heated to approximately 120°-240° F. by a hot air blower, for example, in order to slightly soften the stiffener and to facilitate the removal of twists or bends in the stiffener as it is uncoiled and subjected to longitudinal tension. The heating also increases the temperature of the stiffener which permits a more secure bond to be formed with the adhesive and skin material in processing steps described below.

The stiffener is then subjected to a corona treatment or other surface treatment method to enhance bonding of the adhesive to the stiffener and the skin to the stiffener. Next, an adhesive is applied to the stiffener. The adhesive may be applied by a conventional hot melt system or other methods. The adhesive should be chosen to effect secure bonding of the foam to the stiffener. It will be recognized by those skilled in the art that the adhesive utilized will depend on the materials to be bonded as well as the temperatures the resultant structure will experience during subsequent processing steps and in use as a weatherseal. In a preferred embodiment, effective bonding of low density SANTOPRENE ® foam to a polypropylene stiffener is achieved with hot melts such as HYSOL ® #6009, an amorphous polypropylene based hot melt, and BOSTIK ® #9061, a thermoplastic rubber based pressure sensitive hot melt. SANTOPRENE ® is a registered trademark of Monsanto Company. The characteristics and properties of SANTOPRENE ® are disclosed in U.S. Pat. Nos. 4,130,535 and 4,311,628, incorporated herein by reference. SANTOPRENE ® is a thermoplastic elastomeric composition including blends of olefin rubber and thermoplastic olefin resin.

Foam is supplied from reel 30. The foam is preferably a low density thermoplastic elastomeric foam described in the aforementioned commonly assigned co-pending application. The foam is bonded to the stiffener to which the adhesive has been applied at a point schematically indicated at 35. In order to secure an effective bond to produce a good weatherseal, the foam should have no longitudinal tension as it is bonded to the stiffener.

The foam-stiffener combination is then pulled through die 40 where an outer layer or skin of a melted resin produced by extruder 42 is applied. The details of the application of this outer layer or skin are discussed below. After being pulled through die 40, the resultant weatherseal is cooled by a spray mist of water, a water bath or forced air. An air wipe subsequently removes excess water from the weatherseal if necessary. The weatherseal passes through puller 46 prior to storage or packaging. Puller 46 generates the necessary force for pulling the foam-stiffener combination throughout the above-described operation. Generally, the puller should produce a line speed of about 10 to 200 feet per minute and preferably about 50 to 100 feet per minute. The optimum line speed for producing the door seal of the present embodiment is 60-75 feet per minute. It should be recognized that while the present invention will work at high line speeds, factors such as the surface area of the substrate or portions thereof which are to be coated affect the line speed and must be taken into consideration.

It is not necessary that the foam and stiffener be unwound from reels. It is possible, for example, for either the foam or stiffener or both to be extruded in line with the apparatus of the present invention. Such an arrangement requires careful control of the various line speeds but results in a single production line for the product.

Figure 2:
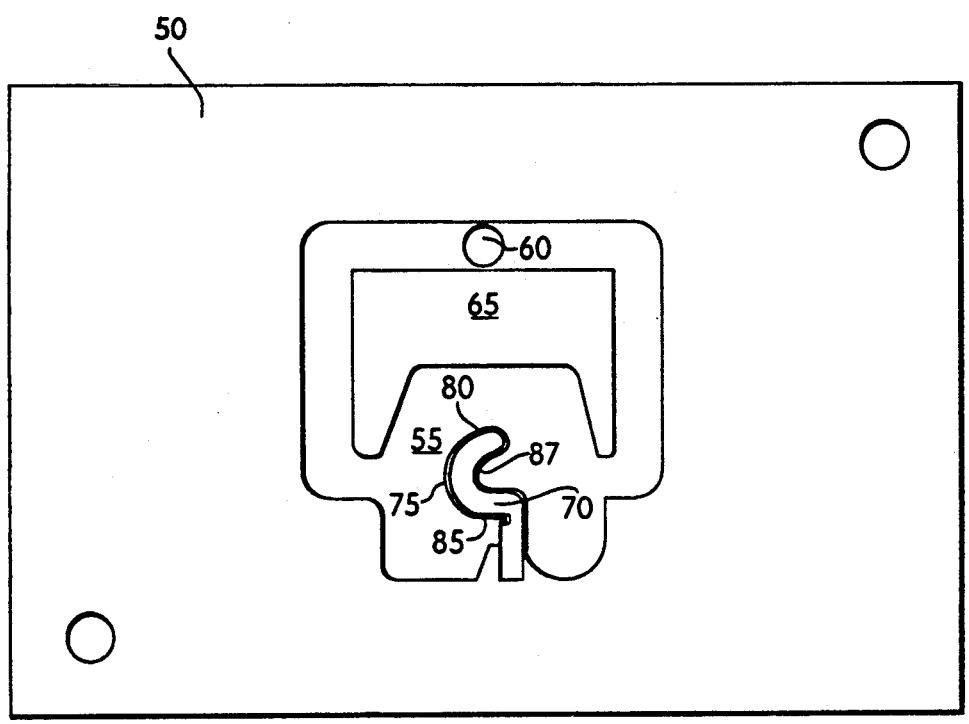
FIG. 2 is a plan view of a die plate in accordance with one embodiment the present invention.

With reference to FIG. 2, die plate 50 of die 40 is typically formed of metal and has a thickness ranging from 0.5 to 0.75 inches. However, these dimensions are not critical and will vary with the requirements of the particular coating process. Die plate 50 includes a resin channel 55 formed on one side thereof. Resin channel 55 has a depth of approximately 0.25 inches. As noted with respect to die thickness, this dimension is not critical and may be varied in accordance with the requirements of a particular coating process. Opening 60 is coupled to the output of extruder 42 shown in FIG. 1. Opening 60 admits resin melted by extruder 42 into resin channel 55. Although the resin admitted to resin channel 55 in the present embodiment is produced by an extrusion apparatus, this is not a necessary requirement for practice of the present invention. For some materials, the application of sufficient heat will create a melt which may be forced into the die under pressure by conventional pumping techniques. The pressure is generally approximately 100 pounds per square inch (psi) and may vary between 50 and 1000 psi depending on the coating process. Some polymers, however, require both heat and shearing action to produce a melt and therefore require an extrusion apparatus. Still other resins for coating a substrate such as latex type resins are room temperature liquids and hence do not require melting and may simply be forced into resin channel 55 under pressure.

The melted resin admitted to resin channel 55 via opening 60 is divided into two streams by die portion 65. The resin within resin channel 55 is at a pressure determined by the operating conditions of extruder 42 (e.g., temperature, screw speed, temperature profile, etc.), the die configuration and the metering gap (described below). Increasing the screw speed of extruder 42, for example, increases the pressure within resin channel 55. As discussed below, the pressure within resin channel 55 controls the thickness of the layer or skin deposited on the substrate.

Figure 3:
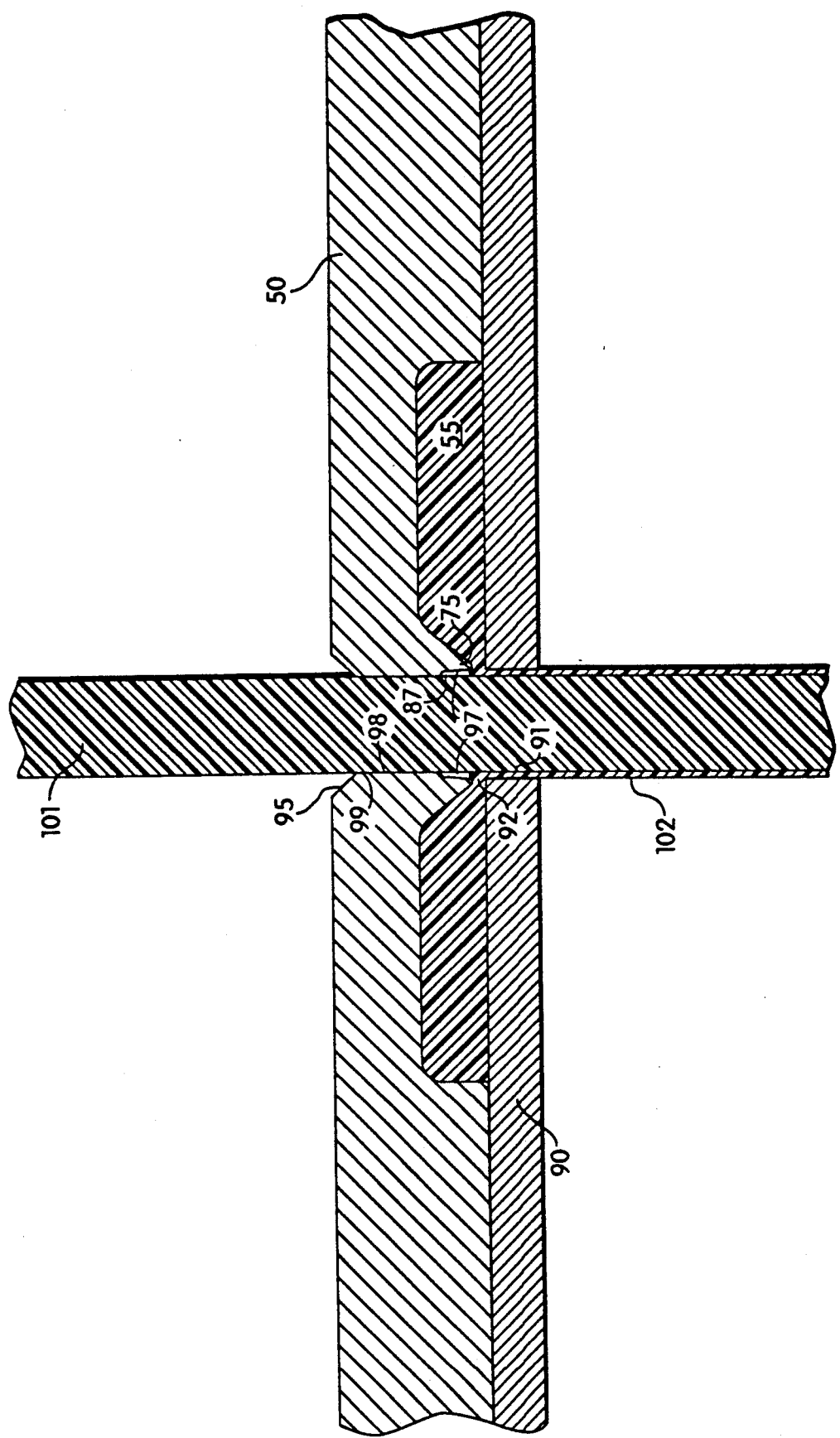
FIG. 3 is a cross-sectional view illustrating the coating of a substrate.

Die opening 70 is formed with wall portion 75 having varying heights. The illustrated die opening is configured to produce the door or window seal of FIG. 4. It will be recognized that die opening 70 may be configured to coat substrates of any shape in accordance with the discussion below. As detailed below, the height of wall portion 75 varies in accordance with the position of the wall portion in resin channel 55 and the thickness of the outer layer or skin desired on the substrate at that point. Die plate 50 cooperates with a face or scraper plate 90 having an opening 91 therein corresponding to die opening 70 and which is secured thereto in a manner to enclose resin channel 55 as shown in FIG. 3. The gaps between face plate 90 and wall portion 75 form metering gap 92 for the resin.

The pressure within resin channel 55 is a function of position therein and generally decreases with increasing distance from opening 60 so as to generate a range of pressures within channel 55. Therefore, in order to provide a layer of uniform thickness to a substrate, the height of wall portion 75 must be varied such that the size of metering gap 92 is correlated with the pressure at that point to generate a uniform resin flow onto all portions of the substrate. For example, the height of the wall portion at point 80 should be greater than the height of the wall portion at point 85 since the pressure on the resin at point 80 is greater than the pressure on the resin at point 85. The decreased wall portion height at point 85 forms a larger metering gap and permits a greater volume of melted resin to flow between face plate 90 and the wall portion to compensate for the reduced pressure and the flow characteristics of the material being applied.

The size of metering gap 92 varies between 0.00 to 0.2 inches in a preferred embodiment for the door seal. The size of the metering gap will vary depending on the particular coating operation. The size of the metering gap at various portions of the resin channel may be varied to provide a uniformly thick skin or to provide a skin whose thickness varies depending on position. The ability to provide a skin of varying thickness is a distinct advantage over prior art techniques of pulling a substrate through a pool of melted resin. In such prior art techniques, the thickness of the skin is not easily controlled nor may different portions of the substrate be coated with different thickness.

Ridge 87 illustrated in FIG. 3 is formed on the inner side of wall portion 75. Ridge 87 is spaced approximately 0.050 inch below the top of the adjacent wall portion and is approximately 0.030 inch wide in the preferred embodiment. The 0.050 inch spacing is not critical. Generally, the spacing should be sufficient to provide a pocket 97 of reduced pressures as compared with the first range of pressures within resin channel 55. Pocket 97 is thus maintained within a second pressure range, the pressures in the second pressure range being lower than pressures in the range of pressures in resin channel 55. The pressures in the second pressure range are generally about atmospheric pressure. Ridge 87 further forms a shoulder which prevents wall portion 75 from contacting substrate 101 as it is pulled through the die. It has been determined that if wall portion 75 contacts substrate 101, a uniform skin is not obtained and a product of low quality is produced. Ridge 87 permits the resin from resin channel 55 to flow through metering gap 92 into pocket 97 at a lower pressure from where it subsequently flows onto substrate 101 being pulled through die opening 70. Thus, a low pressure thin stream of resin flows into pocket 97. Although the resin is at high pressure in resin channel 55, ridge 87 forms a low pressure region or pocket 97 for applying the resin to substrate 101. The application of the resin at approximately atmospheric pressure is important to the production of a uniform skin.

Face plate 90 is secured to die plate 50 by screws for example (not shown). Substrate 101 enters the die through tapered lead 95. Tapered lead 95 ends in a contact surface or shoulder 99. Shoulder 99 and surface 98 serve to position the substrate 101 in the die opening and further prevent the resin from travelling back away from face or scraper plate 90. The resin coated on to the substrate is doctored by face plate 90 made of metal with the door seal profile cut therein to produce outer layer 102. Thus, a low pressure, thin stream of resin is forced into pocket 97 from all sides and as it contacts the substrate, it is doctored.

The thickness of the skin applied to a substrate generally depends on the line speed, the flow speed of the resin, and the doctoring by the face plate. However, assuming a constant line speed, the coating of rigid and non-rigid substrates seems to have slightly different mechanisms. The thickness of the skin on a non-rigid substrate such as foam appears to be determined by the metering gap and the pressure in the resin channel. As more material is forced through the metering gap, the non-rigid substrate is deflected or compressed more and a thicker skin is produced. If not as much material is forced through the metering gap, the non-rigid substrate is deflected or compressed less and a thinner skin is produced. The face plate does not appear to play a critical role in determining the skin thickness for non-rigid substrates or non-rigid portions of substrates. However, there is much less deflection with a rigid substrate and the face plate plays a more important role in determining thickness by scraping or doctoring the applied resin. In the die configuration of the above-described embodiment, the rigid portion of the door seal passes through the die opening at a point remote from opening 60, and consequently, the resin is at a relatively low pressure. It is important to ensure that sufficient material is supplied to provide a skin for the rigid portion. A flow channel may be cut into the face plate to increase the resin flow at that point.

Figure 4:
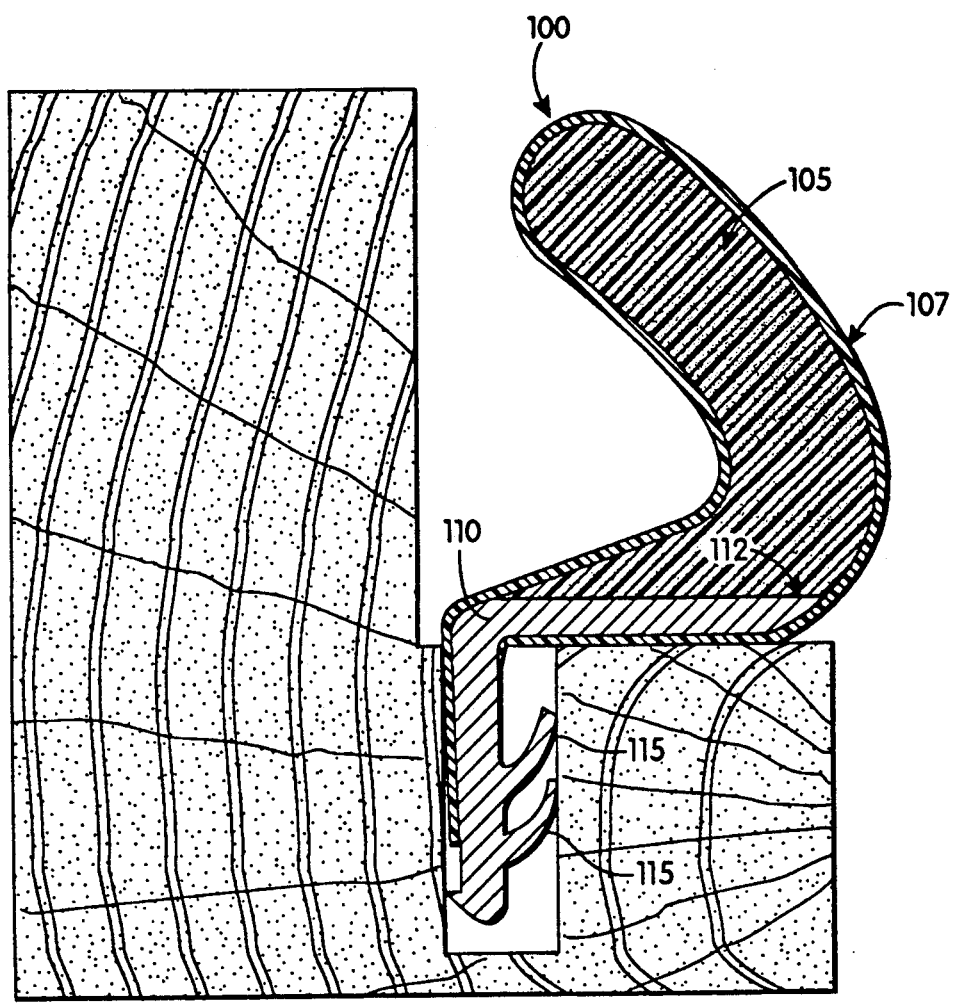
FIG. 4 illustrates a weatherseal formed in accordance with one embodiment the present invention.

Utilizing the present invention, it is also possible to coat only selected portions of a substrate by providing no metering gap at particular points in resin channel 55. That is, at particular points the top of wall portion 75 abuts face plate 90 and no resin flows though. This is particularly important in applications such as weatherseals where portions of the seal perform functions adversely affected by the application of a skin. The door seal of FIG. 4 depicts such a situation. Door seal 100 includes foam profile 105 and stiffener or attachment device 110. An adhesive layer 112 bonds foam profile 105 to stiffener 110. Stiffener 110 includes barbs 115 which secure door seal 100 in a jamb or the like. As noted above, skin 107 should have a low coefficient of friction in order to facilitate the opening and closing of a door. However, this low friction skin 107 should not cover barbs 115 so that the seal can be effectively secured to the door jamb. A low friction layer covering barbs 115 would inhibit their ability to maintain a secure attachment. Such selective application of a skin can not be obtained by pulling or dragging the door seal through a pool of melted resin.

Successful implementation of the present invention requires careful attention to the compatibility of materials, i.e., a good bond must be formed between the skin and the substrate. In general, the applied resin must also be sufficiently hot to form a thermal bond with those portions of the substrate to be coated. In the preferred embodiment, the SANTOPRENE® foam and polypropylene stiffener are coated with a non-foamed SANTOPRENE®-blend skin. The SANTOPRENE® blend preferably consists of 750 parts of SANTOPRENE® 221-64, 250 parts of SANTOPRENE® 223-50, 50 parts Ampacet #10061 (a slip additive), and 80 parts of a color concentrate The numerical designation following "SANTOPRENE®" is a commercial product code which defines certain characteristics of the SANTOPRENE® grade. The SANTOPRENE® blend is extruded from a single screw extruder. The temperature of the melted SANTOPRENE® blend should be approximately 480° F. to form a thermal bond with the stiffener and the foam. The SANTOPRENE®-blend skin has a relatively low coefficient of friction, is soft and compliant, has good strength and has a good resistance to compression set. The SANTOPRENE®-blend skin also achieves a good thermal bond with the SANTOPRENE® foam and the polypropylene stiffener.

The above-described method may be utilized with resins having a wide range of viscosities. Suitable skin materials for appropriate rigid and non-rigid substrates (or combinations of the two) include thermoplastic polymers such as olefinic plastic/olefinic rubber blends, fully cross-linked rubber versions of the above including SANTOPRENE®, polyethylene, ethylene/methacrylic acid copolymer, ethylene/ethyl acrylate polymer, linear low density polyethylene polymers and copolymerizations therewith, ethylene interpolymer/chlorinated polyolefin blends, ionomers (SURLYN®), polypropylene and polypropylene copolymers, nylon, polyesters, and thermoplastic polyurethane and mixtures thereof. SURLYN® is a registered trademark of DuPont. As noted above, room temperature liquid resins such as latex emulsions compounded from silicones, acrylics, polyurethanes, and natural or synthetic rubbers may also be used.

Figure 5:
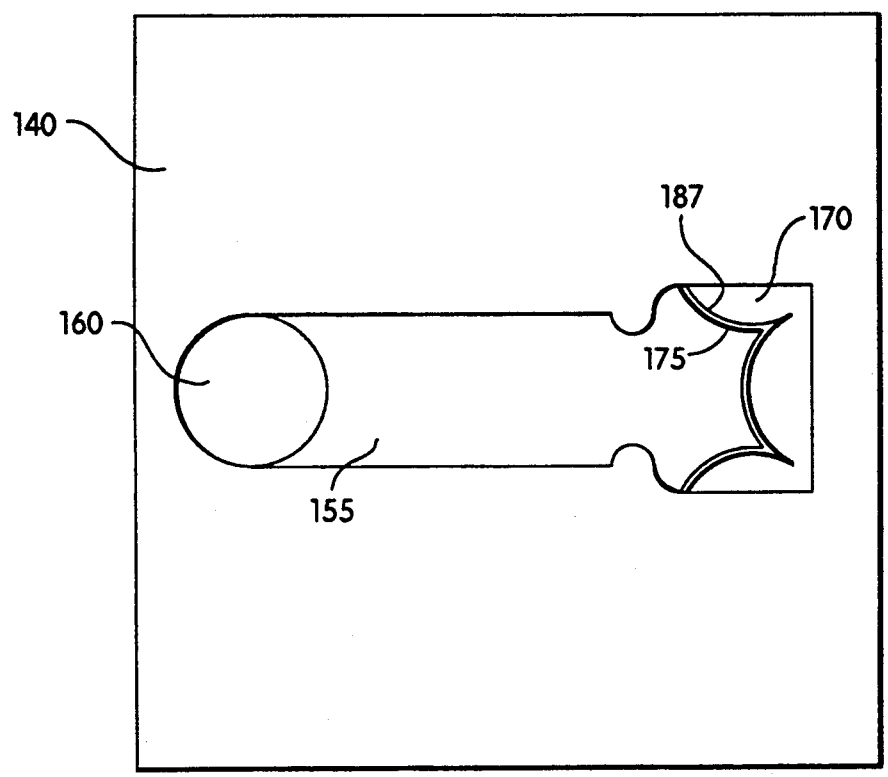
FIG. 5 is a plan view of a die plate in accordance with another embodiment of the present invention.
Figure 6:
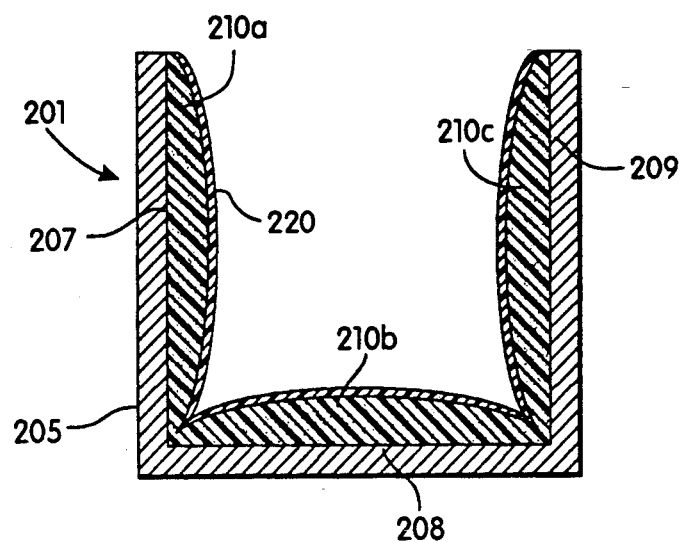
FIG. 6 illustrates a glass run channel formed with the die plate of FIG. 5.

Another embodiment of the present invention is illustrated in FIGS. 5 and 6. FIG. 5 illustrates a die plate generally indicated at 140. Die plate 140 includes resin channel 155 formed on one side thereof and opening 160. Die opening 170 is formed with wall portions 175 having varying heights and having ridge 187 formed on the inner surface thereof. The die portion illustrated in FIG. 5 is configured so as to produce the glass run channel 201 of FIG. 6. Glass run channel 201 includes a roll-formed metal channel 205 having semi-cylindrical foam portions 210a, 210b, 210c adhesively secured to inner walls 207, 208, 209 respectively.

In order to coat the surfaces of foam portions 210a, 210b, 210c with outer layer 220, glass run channel 201 is pulled through the channel of die opening 170. Resin is forced by pressure in resin channel 155 through metering gaps formed by wall portions 175 and a corresponding face plate (not shown) in a manner similar to that discussed with respect to the above described embodiment.

The present invention may also be utilized to provide multiple outer layers to a substrate. Thus, with reference to FIG. 7, a substrate such as the foam-stiffener combination described above may be pulled through die 340 having liquid resin supply 345 and be coated with a first outer layer. If it were desired, for example, to provide strips of a lower friction material over the first outer layer in order to produce a low friction contact surface, the foam-stiffener combination with the first outer layer could be pulled through second die 350 having liquid resin supply 355. This would generate the low friction strip 345 on weatherseal 310 as illustrated in FIG. 8. For example, the first die may apply a skin utilizing the above-reference SANTOPRENE® blend while the second die may apply a latex skin as a low friction overcoat. The heat from SANTOPRENE® cures or dries the latex. Alternatively, the second die may pump a slurry of water and micronized polyethylene or teflon powder or silicone powder or other low friction material onto the hot SANTOPRENE®. It will be apparent that this second layer may cover all or any portion of the first layer in accordance with the desired final product. It will also be apparent that any number of layers may be provided.

Figure 7:
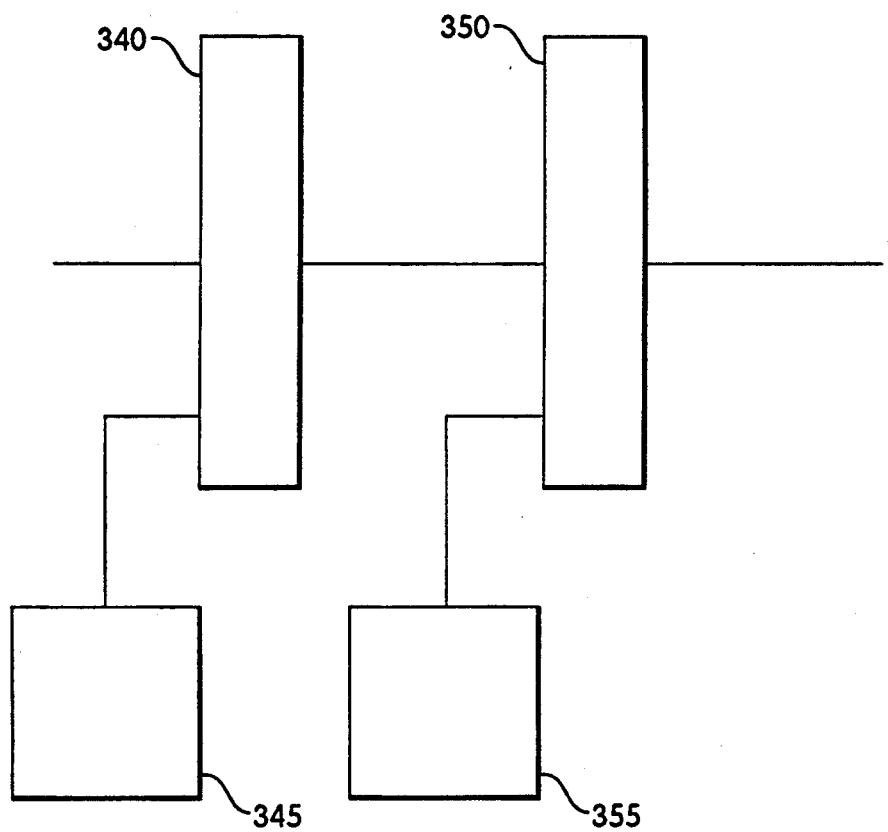
FIG. 7 is a partial block diagram illustrating the operation of another embodiment of the present invention.
Figure 8:
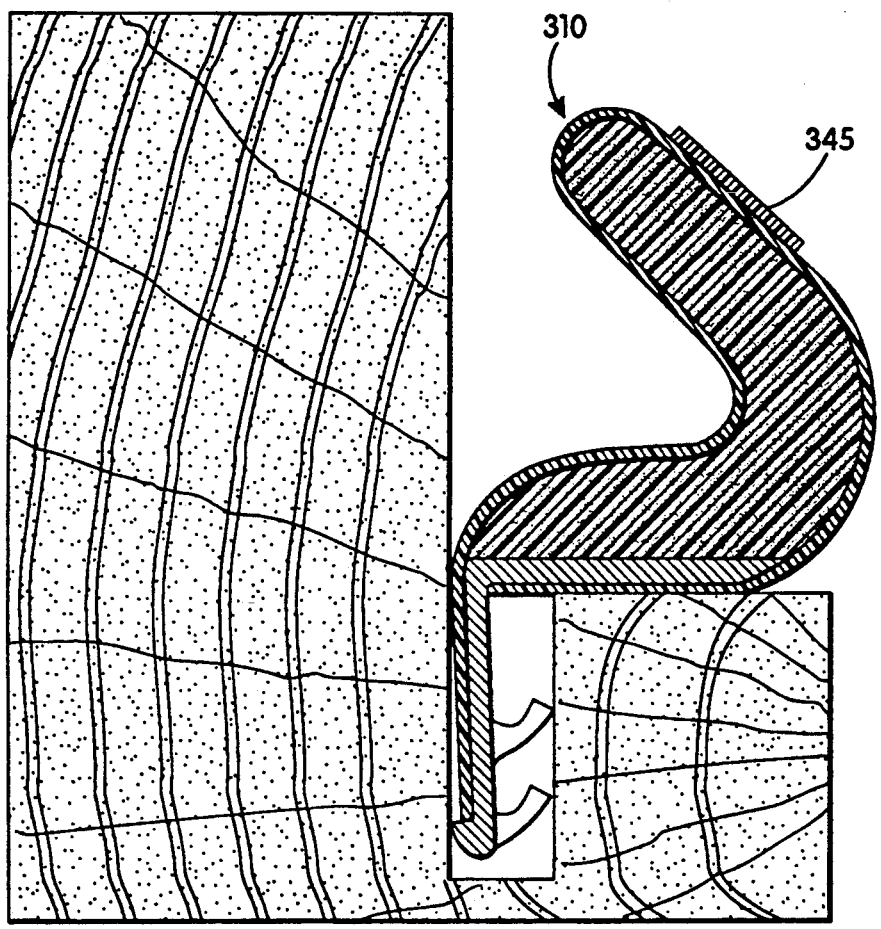
FIG. 8 illustrates a weatherseal formed in accordance with the embodiment of FIG. 7.
Figure 9:
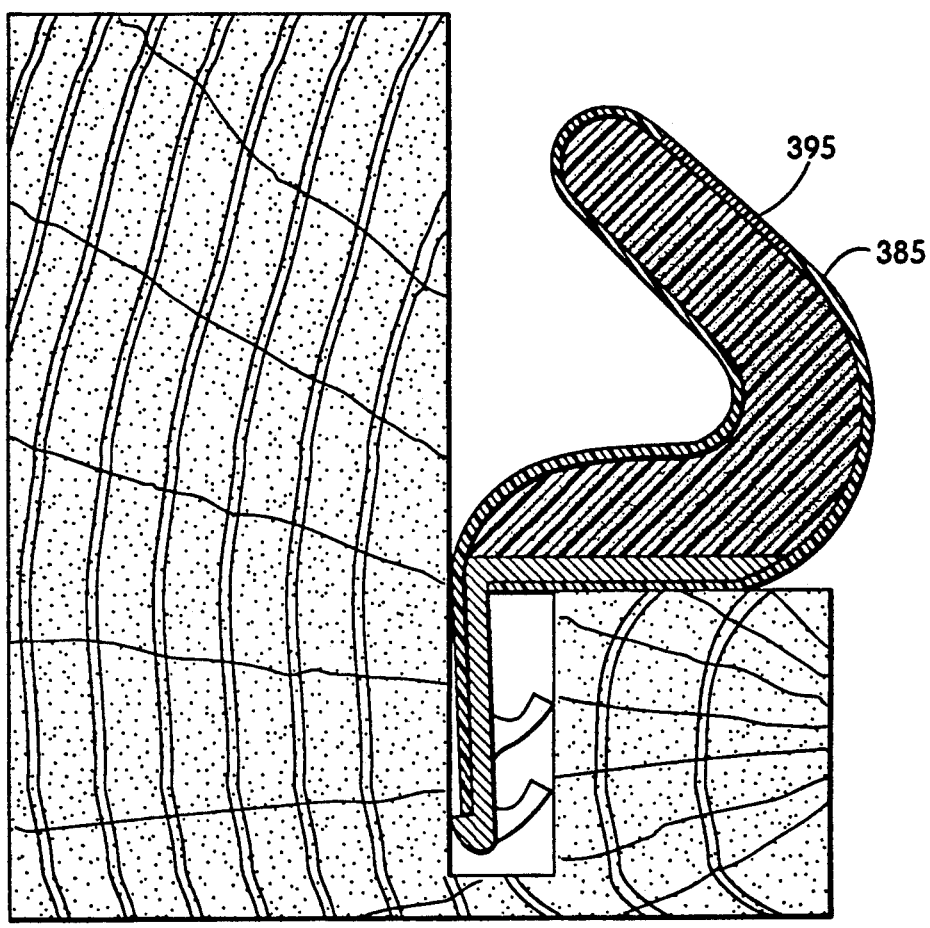
FIG. 9 illustrates another weatherseal formed in accordance with the embodiment of FIG. 7.

Still another embodiment of the method of the present invention may utilize the multiple die arrangement of FIG. 7. A substrate such as the foam-stiffener combination described above may be pulled through die 340 and be coated with a first outer layer covering only a selected portion thereof. The resultant combination could then be pulled through die 350 and portions of the substrate not covered by the first layer could be coated with a second layer coextensive with the first layer. Thus, as shown in FIG. 9, a low friction strip 395 may be provided directly on a selected portion of the substrate with the remainder of the coated portions of the substrate covered with a layer 385 of different material.

Figure 10:
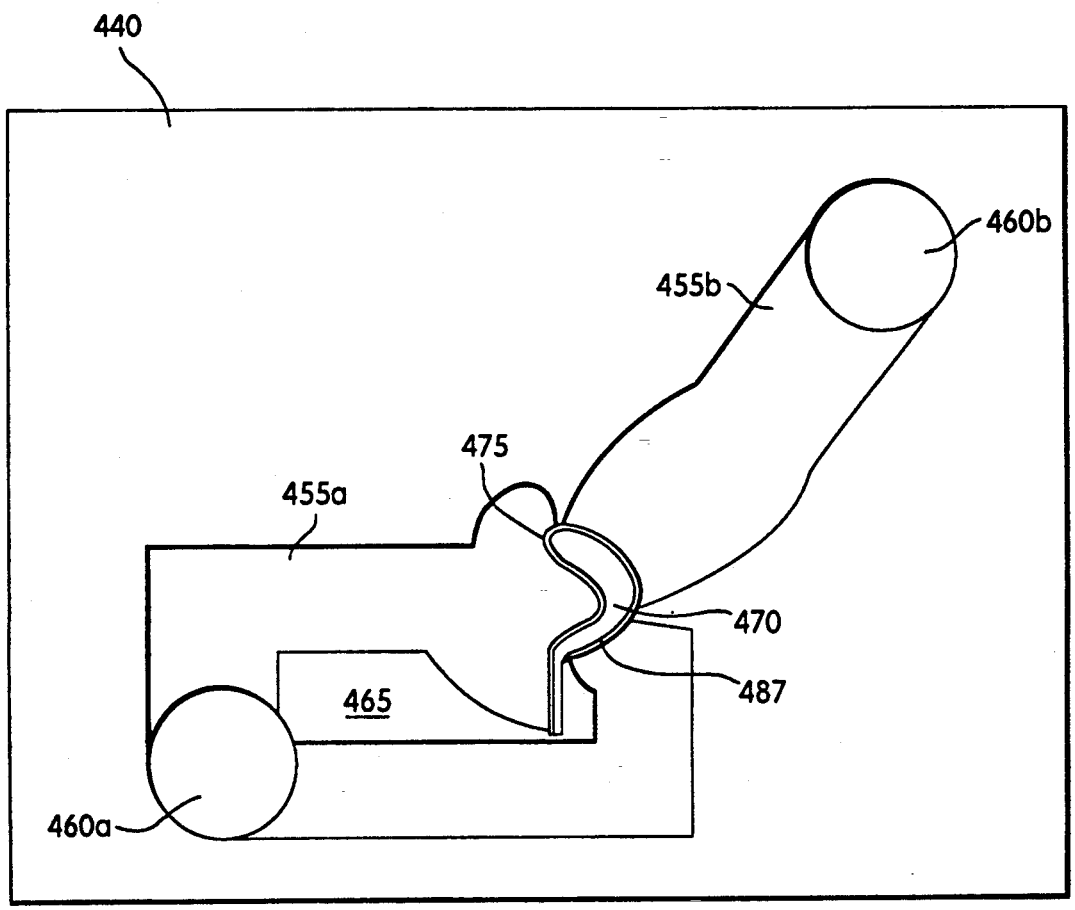
FIG. 10 is a plan view of a die plate in accordance with another embodiment of the present invention.

FIG. 10 illustrates a die plate in accordance with another embodiment of the present invention. Die plate 440 may be utilized to provide a dual extruded skin. Die plate 440 includes resin channels 455a and 455b containing first and second different resins, respectively, for coating a substrate pulled through die opening 470. The first resin is admitted to resin channel 455a through opening 460a and the second resin is admitted to resin channel 455b through opening 460b. The resin in resin channel 455a is divided into two streams by die portion 465. Resin channels 455a and 455b are formed such that there is no mixture of the first and second resins in the channels. The first and second resins are metered between wall portion 475 and a face plate (not shown) into a low pressure pocket formed by ridge 487 from where they are applied to the substrate. The embodiment of FIG. 10 may be used to produce the weatherseal shown in FIG. 9.

In each of these alternative embodiments, as with the preferred embodiment, careful attention must be paid to the choice of materials in order to secure effective bonding.

An important advantage of the present invention is that a less oriented skin is produced, i.e., the skin molecules are not aligned to the same degree as they would be in a crosshead extrusion. The low orientation produces a skin which is strong and rubbery. The skin has uniform strength in all directions and does not propagate lengthwise tears. The skin is less oriented since it is not drawn-down onto the substrate as in a typical crosshead die. The skin becomes oriented during draw down. However, in the present invention, the skin is applied in liquid form and only limited orientation occurs as the substrate passes through the scraper or face plate.

In addition, a high pressure die, because of the high pressures and the resulting flow rates, requires very careful channelling to ensure that the pressures are balanced. The intricate channelling and the requirement of withstanding high pressures require delicate machining and generally increase production costs. The die of the present invention is utilized in a relatively low pressure system which tends to balance its own pressures and does not require intricate channelling. Low pressure regions in the die of the present invention may be easily compensated for by reducing the height of the wall portions. Dies of this type are easier to make and are significantly less expensive than conventional crosshead dies.

EXAMPLE I

SANTOPRENE ® having a durometer reading of 64 was foamed in accordance with the method detailed in the aforementioned commonly assigned co-pending application. A stiffener of polypropylene was bonded to the foam profile as shown in FIG. 1. A blend of 750 parts SANTOPRENE ® 221-64, 250 parts SANTOPRENE ® 223-50, 50 parts Ampacet, #10061, and 80 parts of a color additive was melted in a 1¼Δ extruder operated at 95 revolutions per minute and fed into a die of the type shown in FIGS. 2 and 3 with the die at 480° F. The foam-stiffener combination was pulled through the die at 50 feet per minute and subsequently cooled.

The invention has been described in detail in connection with the preferred embodiments. These embodiments, however, are merely for example only and the invention is not limited thereto. It will be appreciated by those skilled in the art that other variations and modifications can be easily made within the scope of the invention as defined by the appended claims.

We claim:

1. A method of applying a coating to a substrate utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said method comprising the steps of:
   introducing a resin in a liquid state into said resin channel at a predetermined pressure;
   maintaining the liquid resin within a first pressure range in said resin channel;
   metering the liquid resin from said resin channel to said die opening through said metering gap so as to bring the liquid resin from the first pressure range to a second pressure range, the pressures in the second pressure range being generally lower than the pressures in the first pressure range;
   passing said substrate through said die opening; and
   applying the liquid resin at a pressure within the second pressure range to said substrate as said substrate passes through said die opening.

2. The method according to claim 1 wherein said substrate comprises a rigid substrate.

3. The method according to claim 1 wherein said substrate comprises a non-rigid substrate.

4. The method according to claim 1 wherein said substrate comprises both non-rigid and rigid portions.

5. The method according to claim 4 wherein said rigid portion comprises polypropylene and said non-rigid portion comprises a thermoplastic elastomeric foam.

6. The method according to claim 5 wherein said liquid resin comprises a melted thermoplastic elastomer.

7. The method according to claim 1 wherein said liquid resin comprises a melted thermoplastic elastomer.

8. The method according to claim 1 wherein said liquid resin comprises a latex emulsion.

9. The method according to claim 1 wherein said liquid resin comprises a melted resin.

10. The method according to claim 9 wherein said melted resin comprises at least one melted thermoplastic resin selected from the group consisting of ethylene/methacrylic acid copolymer, ethylene/ethyl acrylate polymer, linear low density polyethylene polymers and copolymerizations therewith, ethylene interpolymer/chlorinated polyolefin blends, ionomers, polypropylene copolymers, polyethylene copolymers, nylon, polyesters, and polyurethane.

11. The method according to claim 1 wherein the liquid resin is metered from said resin channel to said die opening so as to coat only predetermined portions of said substrate.

12. The method according to claim 1 wherein the liquid resin is metered from said resin channel to said die opening so as to coat said substrate with varying predetermined thicknesses of said liquid resin.

13. The method according to claim 1 wherein the pressures within the second pressure range are approximately atmospheric pressure.

14. The method according to claim 1 wherein the liquid resin is applied to said substrate so as to produce an outer layer having low orientation.

15. The method according to claim 1 further comprising the step of:
   doctoring the liquid resin coated substrate to configure an outer layer for said substrate.

16. The method according to claim 1 wherein said metering gap is in a range of about 0.00 to about 0.2 inches.

17. A method of providing an outer layer for a substrate utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate distinct from said at least first selected portion by metering the second liquid resin from the resin channel of said second die to the die opening of said second die through the metering gap of said second die, the second liquid resin being applied to said substrate as said substrate passes through the die opening of said second die; and doctoring the second liquid resin coated substrate to configure a second outer layer component at said at least second selected portion of said substrate.

18. The method according to claim 17 wherein said substrate comprises a rigid substrate.

19. The method according to claim 17 wherein said substrate comprises a non-rigid substrate.

20. The method according to claim 17 wherein said substrate comprises a non-rigid portion and a rigid portion.

21. The method according to claim 20 wherein said non-rigid portion comprises a foam and said rigid portion comprises polypropylene.

22. The method according to claim 21 wherein at least one of said first outer layer component and said second outer layer component 23. The method according to claim 21 wherein one of said first and said second outer layer components comprises a thermoplastic elastomer and the other of said first and said second outer layer components comprises a lower friction layer.

24. A method of providing an outer layer for a substrate utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate by metering the second liquid resin from the resin channel of said second die to the die opening of said second die through the metering gap of said second die, the second liquid resin being applied to said substrate as said substrate passes through the die opening of said second die, said second selected portion overlaying at least part of said first selected portion;

doctoring the second liquid coated substrate to configure a second outer layer component at said at least second selected portion of said substrate.

25. The method according to claim 24 wherein said substrate comprises a rigid substrate.

26. The method according to claim 24 wherein said substrate comprises a non-rigid substrate.

27. The method according to claim 24 wherein said substrate comprises a non-rigid substrate and a rigid substrate.

28. The method according to claim 27 wherein said non-rigid substrate comprises a foam and said rigid substrate comprises polypropylene.

29. The method according to claim 28 wherein said second outer layer component comprises a low friction layer.

30. The method according to claim 28 wherein said first outer layer component comprises a thermoplastic elastomer and said second outer layer component comprises a lower friction layer.

31. A method of applying a coating to a substrate utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said method comprising the steps of:

introducing a resin in the liquid state into said resin channel;

metering the liquid resin from said resin channel to said die opening through said metering gap;

passing said substrate through said die opening; and applying the liquid resin to said substrate as said substrate passes through said die opening.

32. A die for coating a substrate, said die comprising:

a die plate;

a face plate coupled to said die plate so as to define a resin channel therein for maintaining a resin in a liquid state within a first pressure range;

a die opening in said die plate and said face plate for passing said substrate therethrough; and a wall disposed between said resin channel and said die opening so as to form a metering gap between a top of said wall and said face plate for metering the liquid resin from said resin channel to said die opening so as to bring the liquid resin from the first pressure range to a second pressure range in order to coat said substrate with the liquid resin, the pressures in the second pressure range generally being lower than the pressures in the first pressure range.

33. The die according to claim 32 wherein said wall meters the liquid resin so as to coat only predetermined portions of said substrate.

34. The die according to claim 32 wherein said wall meters the liquid resin so as to coat said substrate with varying predetermined thicknesses of the liquid resin.

35. The die according to claim 32 wherein said metering gap is in a range of about 0.00 to about 0.2 inches.

36. A die for coating a substrate, said die comprising:
   a die plate;
   a face plate coupled to said die plate so as to define first and second resin channels therein for maintaining respective first and second resins in a liquid state within a first and a second pressure range, respectively;
   a die opening formed in said die plate and said face plate for passing said substrate therethrough;
   a wall disposed between said first and second resin channels and said die opening so as to form a metering gap between a top of said wall and said face plate for metering the first and second liquid resins from said first and second resin channels to said die opening so as to bring the first and second liquid resins from the first and second pressure ranges to a low pressure range in order to coat said substrate with the first and second liquid resins, the pressures in low pressure range being generally lower than the pressures in the first and second pressure ranges.

37. A die for coating a substrate, said die comprising:
   a die plate;
   a face plate coupled to said die plate so as to define a resin channel therein for containing a resin in a liquid state;
   a die opening formed in said die plate and said face plate for passing said substrate therethrough; and
   a wall disposed between said resin channel and said die opening so as to form a metering gap between a top of said wall and said face plate for metering the liquid resin from said resin channel to said die opening in order to coat said substrate with the liquid resin.

38. An apparatus for providing an outer layer for a substrate, said outer layer comprising at least a first and a second component of different materials, said apparatus including first and second dies supplied with first and second liquid resins, respectively, each die comprising a die plate, a face plate coupled to said die plate so as to define a resin channel therein for maintaining a resin in the liquid state, a die opening formed in said die plate and said face plate for passing said substrate therethrough, a wall disposed between said resin channel and said die opening so as to form a metering gap between a top of said wall and said face plate for metering liquid resin from said resin channel to said die opening, said first die arranged to apply the first liquid resin to at least a first selected portion of said substrate and said second die arranged to apply the second liquid resin to at least a second selected portion of said substrate, wherein said first and said second selected portions at least partially overlap.

39. A die for coating a substrate, said die comprising:
   a die plate;
   a face plate coupled to said die plate so as to define first and second resin channels therein for containing respective first and second resins in a liquid state;
   a die opening formed in said die plate and said face plate for passing said substrate therethrough; and
   a wall disposed between said first and second resin channels and said die opening so as to form a metering gap between a top of said wall and said face plate for metering the first and second liquid resins from said first and second resin channels to said die opening in order to coat said substrate with the first and second liquid resins.

40. The die according to claim 39 wherein said metering gap is in a range of about 0.00 to about 0.2 inches.

* * * * *

UNITED STATES PATENT AND TRADEMARK OFFICE
CERTIFICATE OF CORRECTION

PATENT NO.   : 5,192,586
DATED        : March 9, 1993
INVENTOR(S)  : Mertinooke et al.

It is certified that error appears in the above-identified patent and that said Letters Patent is hereby corrected as shown below:

Column 11,
Line 46, please add the following to claim 22 after "layer component". -- comprises a low friction layer. --

Signed and Sealed this

Tenth Day of September, 2002

Attest:

Attesting Officer

JAMES E. ROGAN
Director of the United States Patent and Trademark Office

US005192586C1

(12) EX PARTE REEXAMINATION CERTIFICATE (5105th)
United States Patent
Mertinooke et al.

(10) Number: US 5,192,586 C1
(45) Certificate Issued: May 3, 2005

(54) METHOD AND APPARATUS FOR COATING A SUBSTRATE WITH A LIQUID RESIN

(75) Inventors: Peter E. Mertinooke, Amesbury, MA (US); Louis Halberstadt, Andover, MA (US); Dan C. Muessel, Danvers, MA (US); Joseph V. Perry, Chester, NH (US)

(73) Assignee: Amesbury Group, Inc., Manchester-by-the-Sea, MA (US)

Reexamination Request:
No. 90/006,265, Apr. 12, 2002

Reexamination Certificate for:
Patent No.: 5,192,586
Issued: Mar. 9, 1993
Appl. No.: 07/650,974
Filed: Feb. 1, 1991

Certificate of Correction issued Sep. 10, 2002.

Related U.S. Application Data

(63) Continuation of application No. 07/270,778, filed on Nov. 14, 1988, now abandoned.

(51) Int. Cl.⁷ .............................. B05D 5/08; B05D 1/26; B05D 3/12; B05C 3/15
(52) U.S. Cl. ...................... 427/210; 427/209; 427/235; 427/261; 427/286; 427/358; 118/405; 118/408; 118/410; 118/411
(58) Field of Search .................................. 427/209, 210, 427/235, 244, 261, 286, 356, 358; 118/405, 408, 410, 411, 412; 428/319.7, 319.9; 425/90, 92, 93, 96, 461, 466; 264/171.13, 171.17, 171.18, 171.23, 171.24

(56) References Cited

U.S. PATENT DOCUMENTS

| 343,345 A | 6/1886 | Sparks |
| 874,938 A | 12/1907 | Cazin |
| 1,312,034 A | 8/1919 | Jones |
| 1,776,073 A | 9/1930 | Girard et al. |
| 1,805,145 A | 5/1931 | Koops |
| 1,826,297 A | 10/1931 | Apple |
| 1,943,818 A | 1/1934 | Fantone et al. ................. 91/32 |
| 1,960,137 A | 5/1934 | Brown ......................... 154/43 |
| 1,960,997 A | 5/1934 | Halloran ........................ 18/13 |
| 2,012,625 A | 8/1935 | Calcutt ........................... 20/69 |

(Continued)

FOREIGN PATENT DOCUMENTS

| CA | 852096 | 9/1970 | ..................... 18/35 |
| CA | 1177212 | 11/1984 | ................... 18/661 |
| DE | 3503200 | 5/1986 | .......... B29C/47/30 |
| EP | 0260674 A2 | 3/1988 | ............. B05C/5/02 |
| FR | 1590375 | 5/1970 | |
| FR | 2200109 | 4/1974 | |
| FR | 2310207 | 12/1976 | |
| FR | 2572678 | 5/1986 | |
| GB | 1160043 | 7/1969 | ............. B05C/5/02 |
| GB | 1305808 | 2/1973 | ........... B32B/27/20 |

(Continued)

OTHER PUBLICATIONS

Webster's Third New International Dictionary of the English Language Unabridged, G & C Merriam Company, Publishers, 1961, p. 2087.*

(Continued)

Primary Examiner—Katherine Bareford

(57) ABSTRACT

A method and apparatus of applying a coating to a substrate is provided. A liquid resin is introduced into a first region at a predetermined pressure. The liquid resin is maintained within a first pressure range in the first region. Next, the flow of the resin from the first region to a second region is controlled so as to bring the resin from the first pressure range to a second pressure range, the pressures in the second pressure range being lower than the pressures in the first pressure range. The liquid resin is then applied at a pressure within the second pressure range to the substrate at a third region adjacent the second region.

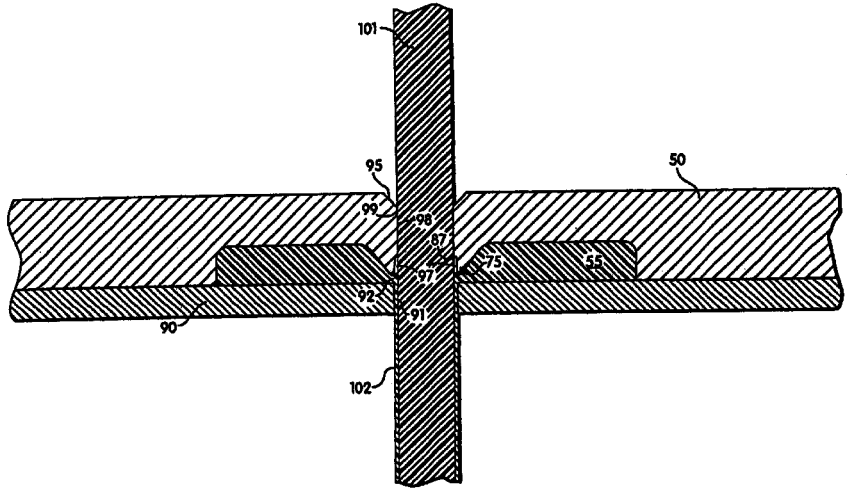

U.S. PATENT DOCUMENTS

| | | | |
|---|---|---|---|
| 2,115,368 A | 4/1938 | Lustberg | 112/262 |
| 2,127,413 A | 8/1938 | Leguillon | 91/46 |
| 2,138,699 A | 11/1938 | Hinze | 93/39.1 |
| 2,175,099 A | 10/1939 | Abbott | 18/13 |
| 2,199,067 A | 4/1940 | Bradt | 91/32 |
| 2,200,933 A | 5/1940 | Nystrom et al. | 173/244 |
| 2,218,482 A | 10/1940 | Reevely | 91/32 |
| 2,280,415 A | 4/1942 | Larmuth | 91/33 |
| 2,293,252 A | 8/1942 | Foster et al. | 18/13 |
| 2,314,168 A | 3/1943 | Smith | 91/53 |
| 2,341,450 A | 2/1944 | Knaus | 91/32 |
| 2,354,426 A | 7/1944 | Briant | 117/76 |
| 2,366,077 A | 12/1944 | Wildy et al. | 91/53 |
| 2,386,995 A | 10/1945 | Wigal | 260/36 |
| 2,390,780 A | 12/1945 | Cornwell | 117/73 |
| 2,415,721 A | 2/1947 | Arner | 229/5.5 |
| 2,550,520 A | 4/1951 | Bennett | 229/48 |
| 2,555,380 A | 6/1951 | Stuart et al. | 229/3.5 |
| 2,602,959 A | 7/1952 | Fenlin | 18/12 |
| 2,623,444 A | 12/1952 | Maier et al. | 93/94 |
| 2,626,426 A | 1/1953 | Stahl | 18/4 |
| 2,657,414 A | 11/1953 | Miller et al. | 15/210 |
| 2,677,633 A | 5/1954 | Gross | 154/116 |
| 2,695,421 A | 11/1954 | Amundson et al. | 18/13 |
| 2,724,877 A | 11/1955 | Ramsay | 20/69 |
| 2,726,632 A | 12/1955 | Asbeck et al. | 118/410 |
| 2,748,044 A | 5/1956 | Seiler | 154/52.1 |
| 2,754,543 A | 7/1956 | Loew | 18/13 |
| 2,757,709 A | 8/1956 | Crabbe et al. | 154/4 |
| 2,761,417 A | 9/1956 | Russell et al. | 118/410 |
| 2,761,418 A | 9/1956 | Russell | 118/410 |
| 2,761,791 A | 9/1956 | Russell | 117/34 |
| 2,778,059 A | 1/1957 | Henning et al. | 18/13 |
| 2,786,622 A | 3/1957 | Ross et al. | 229/55 |
| 2,797,443 A | 7/1957 | Carlson | 18/48 |
| 2,821,497 A | 1/1958 | Works et al. | 154/45.9 |
| 2,838,813 A | 6/1958 | Naramore | 20/69 |
| 2,839,796 A | 6/1958 | Quoss | 20/64 |
| 2,868,159 A | 1/1959 | Lit et al. | 118/125 |
| 2,874,752 A | 2/1959 | Brey | 154/1.8 |
| 2,880,698 A | 4/1959 | Olson | 118/405 |
| 2,911,382 A | 11/1959 | Barkhnff et al. | 260/2.5 |
| 2,933,782 A | 4/1960 | Cornell | 20/64 |
| 2,933,784 A | 4/1960 | Hooverson | 20/69 |
| 2,952,240 A | 9/1960 | Abbott | 118/405 |
| 2,977,632 A | 4/1961 | Bunch | 18/13 |
| 3,029,779 A | 4/1962 | Hornbostel | 118/104 |
| 3,032,008 A | 5/1962 | Land et al. | 118/411 |
| 3,032,812 A | 5/1962 | Van Riper | 18/6 |
| 3,041,681 A | 7/1962 | Goodwin | 20/69 |
| 3,041,682 A | 7/1962 | Alderfer et al. | 20/69 |
| 3,075,653 A | 1/1963 | Wales et al. | 214/11 |
| 3,081,213 A | 3/1963 | Chinn | 156/192 |
| 3,155,540 A | 11/1964 | Loeffler et al. | 118/60 |
| 3,155,543 A | 11/1964 | Marzocchi et al. | 118/405 |
| 3,167,827 A | 2/1965 | Alley et al. | 20/69 |
| 3,184,811 A | 5/1965 | Bennett et al. | 22/70 |
| 3,206,323 A | 9/1965 | Miller et al. | 117/34 |
| 3,227,577 A | 1/1966 | Baessler et al. | 117/102 |
| 3,251,911 A | 5/1966 | Hansen | 264/25 |
| 3,287,477 A | 11/1966 | Vesilind | 264/53 |
| 3,309,439 A | 3/1967 | Nonweiler | 264/45 |
| 3,350,248 A | 10/1967 | Demarest, Jr. et al. | 156/24 |
| 3,378,956 A | 4/1968 | Parks et al. | 49/485 |
| 3,385,001 A | 5/1968 | Bordner | 49/489 |
| 3,407,253 A | 10/1968 | Yoshimura et al. | 264/289 |
| 3,412,709 A | 11/1968 | Goyffon | 118/405 |
| 3,420,208 A | 1/1969 | Guthrie | 118/2 |
| 3,424,130 A | 1/1969 | Byrnes et al. | 118/405 |
| 3,448,543 A | 6/1969 | Multer | 49/470 |
| 3,450,098 A | 6/1969 | Williams | 118/126 |
| 3,469,349 A | 9/1969 | Multer | 49/478 |
| 3,471,898 A | 10/1969 | Krystof | 18/13 |
| 3,473,512 A | 10/1969 | Wood | 118/125 |
| 3,482,006 A | 12/1969 | Carlson | 264/54 |
| 3,531,829 A | 10/1970 | Skobel et al. | 18/13 |
| 3,535,824 A | 10/1970 | Kessler | 49/488 |
| 3,564,773 A | 2/1971 | Bonnaud | 49/488 |
| 3,595,204 A | 7/1971 | McIntyre | 118/8 |
| 3,596,432 A | 8/1971 | Straub et al. | 53/133 |
| 3,624,964 A | 12/1971 | Bordner et al. | 49/475 |
| 3,635,620 A | 1/1972 | Brown | 425/113 |
| 3,669,062 A | 6/1972 | Kallianides et al. | 118/9 |
| 3,672,974 A | 6/1972 | Tomlinson | 117/115 |
| 3,685,206 A | 8/1972 | Kessler | 49/489 |
| 3,700,368 A | 10/1972 | Wells | 425/115 |
| 3,700,486 A | 10/1972 | Veltri et al. | 117/71 |
| 3,733,660 A | 5/1973 | Kallianides et al. | 29/25.41 |
| 3,737,490 A | 6/1973 | Nicholson | 264/40 |
| 3,755,873 A | 9/1973 | Lansing | 29/202.5 |
| 3,762,100 A | 10/1973 | Kempel | 49/468 |
| 3,767,454 A | 10/1973 | Franke, Jr. et al. | 117/61 |
| 3,781,390 A | 12/1973 | Wells | 264/47 |
| 3,782,870 A | 1/1974 | Schippers | 425/4 C |
| 3,789,099 A | 1/1974 | Garrett et al. | 264/174 |
| 3,811,989 A | 5/1974 | Hearn | 161/5 |
| 3,813,199 A | 5/1974 | Friesner | 425/113 |
| 3,814,779 A | 6/1974 | Wiley | 264/53 |
| 3,815,637 A | 6/1974 | Carrow | 138/45 |
| 3,827,841 A | 8/1974 | Kawai et al. | 425/4 |
| 3,836,297 A | 9/1974 | Weaver | 425/104 |
| 3,840,384 A | 10/1974 | Reade et al. | |
| 3,841,807 A | 10/1974 | Weaver | 425/104 |
| 3,842,564 A | 10/1974 | Brown | 52/716 |
| 3,843,475 A | 10/1974 | Kent | 161/4 |
| 3,869,325 A | 3/1975 | Witzig | 156/192 |
| 3,874,329 A | 4/1975 | McLarty | 118/125 |
| 3,876,487 A | 4/1975 | Garrett et al. | 156/390 |
| 3,882,817 A | 5/1975 | Zink | 118/126 |
| 3,882,819 A | 5/1975 | Skeeters | 118/405 |
| 3,886,898 A | 6/1975 | Colegrove et al. | 118/411 |
| 3,888,713 A | 6/1975 | Alderfer | 156/93 |
| 3,903,233 A | 9/1975 | Dougherty | 264/174 |
| 3,907,536 A | 9/1975 | Achener | 65/60 |
| 3,918,206 A | 11/1975 | Dochnahl | 49/441 |
| 3,928,521 A | 12/1975 | Haren et al. | 264/49 |
| 3,937,644 A | 2/1976 | Bergeron et al. | 156/498 |
| 3,940,467 A | 2/1976 | Brachman | 264/45.5 |
| 3,941,543 A | 3/1976 | Buonanno | 425/371 |
| 3,944,459 A | 3/1976 | Skobel | 156/461 |
| 3,952,552 A | 4/1976 | Rozner | 66/125 |
| 3,956,438 A | 5/1976 | Schippers | 264/46.1 |
| 3,965,931 A | 6/1976 | Skobel | 137/561 A |
| 3,981,830 A | 9/1976 | Takeuchi et al. | 260/2.5 HA |
| 3,999,509 A | 12/1976 | Lucas | 118/47 |
| 4,020,194 A | 4/1977 | McIntyre et al. | 427/172 |
| 4,049,760 A | 9/1977 | Lozach | 264/51 |
| 4,073,408 A | 2/1978 | Hartwig | 222/145 |
| 4,075,851 A | 2/1978 | Gardner | 61/22 |
| 4,077,443 A | 3/1978 | Coller et al. | 141/111 |
| 4,087,223 A | 5/1978 | Angioletti et al. | 425/112 |
| 4,096,973 A | 6/1978 | Checko | 222/146 |
| 4,104,207 A | 8/1978 | Pelikan et al. | 521/84 |
| 4,106,437 A | 8/1978 | Bartlett | 118/412 |
| 4,107,260 A | 8/1978 | Dougherty | 264/349 |
| 4,116,159 A | 9/1978 | Long | 118/34 |
| 4,117,196 A | 9/1978 | Mathias | 428/379 |
| 4,118,166 A | 10/1978 | Bartrum | 427/462 |
| 4,119,325 A | 10/1978 | Oakley et al. | 277/207 |
| 4,123,100 A | 10/1978 | Ellis | 296/93 |
| 4,124,336 A | 11/1978 | Johnson | 425/4 |

| Patent No. | Date | Inventor | Class |
|---|---|---|---|
| 4,130,535 A | 12/1978 | Coran et al. | 260/33.6 |
| 4,144,838 A | 3/1979 | Ichiyanagi et al. | 118/125 |
| 4,156,044 A | 5/1979 | Mracek et al. | 427/444 |
| 4,157,149 A | 6/1979 | Moen | 222/486 |
| 4,181,647 A | 1/1980 | Beach | 264/45.9 |
| 4,181,780 A | 1/1980 | Brenner et al. | 521/93 |
| 4,185,416 A | 1/1980 | Wilmes | 49/406 |
| 4,187,068 A | 2/1980 | Vassar | 425/381 |
| 4,189,520 A | 2/1980 | Gauchel | 428/520 |
| 4,200,207 A | 4/1980 | Akers et al. | 222/190 |
| 4,204,496 A | 5/1980 | Ikegami et al. | 118/405 |
| 4,204,821 A | 5/1980 | Gauchel et al. | 425/131.1 |
| 4,206,011 A | 6/1980 | Kanotz et al. | 156/498 |
| 4,208,200 A | 6/1980 | Claypoole et al. | 65/11 |
| 4,212,787 A | 7/1980 | Matsuda et al. | 260/33.6 AQ |
| 4,222,729 A | 9/1980 | Ragazzini et al. | 425/378 |
| 4,226,662 A | 10/1980 | McCort | 156/390 |
| 4,238,260 A | 12/1980 | Washkewicz | 156/149 |
| 4,246,299 A | 1/1981 | Ohls | 427/54.1 |
| 4,258,646 A | 3/1981 | Kloczewski et al. | 118/50.1 |
| 4,259,379 A | 3/1981 | Britton et al. | 427/356 |
| 4,263,348 A | 4/1981 | Renegar | 427/286 |
| 4,274,596 A | 6/1981 | Howes | 239/533.9 |
| 4,274,821 A | 6/1981 | Kiemer | 425/114 |
| 4,277,301 A | 7/1981 | McIntyre et al. | 156/446 |
| 4,287,684 A | 9/1981 | McKann | 49/468 |
| 4,288,482 A | 9/1981 | Beck | 428/92 |
| 4,290,249 A | 9/1981 | Mass | 52/396 |
| 4,296,062 A | 10/1981 | Gauchel et al. | 264/173 |
| 4,299,186 A | 11/1981 | Pipkin et al. | 118/407 |
| 4,299,187 A | 11/1981 | Renegar | 118/411 |
| 4,305,900 A | 12/1981 | Cavalli | 264/174 |
| 4,305,984 A | 12/1981 | Boyce | 428/85 |
| 4,308,352 A | 12/1981 | Knaus | 521/79 |
| 4,309,160 A | 1/1982 | Poutanen et al. | 425/113 |
| 4,311,628 A | 1/1982 | Abdou-Sabet et al. | 260/33.6 |
| 4,312,950 A | 1/1982 | Snyder et al. | 435/295 |
| 4,312,958 A | 1/1982 | DiGiulio et al. | 521/88 |
| 4,313,645 A | 2/1982 | Cocco | 339/103 |
| 4,314,834 A | 2/1982 | Feenstra et al. | 65/11.1 |
| 4,321,072 A | 3/1982 | Dubos et al. | 65/3.11 |
| 4,323,655 A | 4/1982 | DiGiulio et al. | 521/88 |
| 4,328,273 A | 5/1982 | Yackiw | 428/122 |
| 4,341,509 A | 7/1982 | Harlow | 425/114 |
| 4,343,845 A | 8/1982 | Burden et al. | 428/122 |
| 4,344,710 A | 8/1982 | Johnson et al. | 366/76 |
| 4,347,806 A | 9/1982 | Argazzi et al. | 118/710 |
| 4,352,892 A | 10/1982 | Lohmar | 521/79 |
| 4,354,989 A | 10/1982 | Beach | 264/40.6 |
| 4,356,216 A | 10/1982 | Gailey et al. | 427/286 |
| 4,358,497 A | 11/1982 | Miska | 428/85 |
| 4,360,395 A | 11/1982 | Suzuki | 156/54 |
| 4,368,224 A | 1/1983 | Jackson | 428/31 |
| 4,370,355 A | 1/1983 | Niesse | 427/9 |
| 4,387,123 A | 6/1983 | Wollam et al. | 427/286 |
| 4,401,612 A | 8/1983 | Nehney et al. | 264/53 |
| 4,401,783 A | 8/1983 | Kotian | 524/371 |
| 4,409,165 A | 10/1983 | Kim | 264/53 |
| 4,409,365 A | 10/1983 | Coran et al. | 525/78 |
| 4,419,309 A | 12/1983 | Krutchen | 264/53 |
| 4,419,958 A | 12/1983 | Roba | 118/405 |
| 4,421,867 A | 12/1983 | Nojiri et al. | 521/82 |
| 4,438,223 A | 3/1984 | Hunter | 521/92 |
| 4,442,788 A | 4/1984 | Weis | 118/405 |
| 4,446,179 A | 5/1984 | Waugh | 428/31 |
| 4,454,687 A | 6/1984 | Baker | 49/419 |
| 4,458,376 A | 7/1984 | Sitko | 15/256.5 |
| 4,458,450 A | 7/1984 | Young et al. | 49/489 |
| 4,470,941 A | 9/1984 | Kurtz | 264/136 |
| 4,474,830 A | 10/1984 | Taylor | 427/54.1 |
| 4,476,165 A | 10/1984 | McIntyre | 427/258 |
| 4,477,298 A | 10/1984 | Bohannon, Jr. et al. | 156/54 |
| 4,510,031 A | 4/1985 | Matsusura et al. | 204/159.2 |
| 4,510,884 A | 4/1985 | Rosebrooks | 118/405 |
| 4,512,945 A | 4/1985 | Viganó | 264/263 |
| 4,517,316 A | 5/1985 | Mason | 521/81 |
| 4,526,736 A | 7/1985 | Searl et al. | 264/53 |
| 4,527,825 A | 7/1985 | Clouse | 296/1 |
| 4,530,851 A | 7/1985 | Shannon et al. | 427/9 |
| 4,532,260 A | 7/1985 | MacKeighen et al. | 521/84.1 |
| 4,535,564 A | 8/1985 | Yackiw | 49/489 |
| 4,537,825 A | 8/1985 | Yardley | 428/327 |
| 4,538,380 A | 9/1985 | Colliander | 49/475 |
| 4,557,217 A | 12/1985 | Zingg | 118/300 |
| 4,559,095 A | 12/1985 | Babbin | 156/244.13 |
| 4,562,023 A | 12/1985 | Pabst et al. | 264/75 |
| 4,563,141 A | 1/1986 | Zoller | 425/114 |
| 4,568,507 A | 2/1986 | Baxter | 264/172 |
| 4,569,704 A | 2/1986 | Bohannon, Jr. et al. | 156/48 |
| 4,581,383 A | 4/1986 | Park | 521/91 |
| 4,583,485 A | 4/1986 | Smith, Jr. | 118/68 |
| 4,585,035 A | 4/1986 | Piccoli | 138/127 |
| 4,587,133 A | 5/1986 | Shannon et al. | 427/9 |
| 4,589,367 A | 5/1986 | Renegar et al. | 118/66 |
| 4,593,062 A | 6/1986 | Puydak et al. | 524/426 |
| 4,600,728 A | 7/1986 | MacKeighen et al. | 521/84.1 |
| 4,601,918 A | 7/1986 | Zaman et al. | 427/120 |
| 4,604,300 A | 8/1986 | Keys et al. | 427/120 |
| 4,613,521 A | 9/1986 | Smith, Jr. | 427/169 |
| 4,616,052 A | 10/1986 | Habibullah | 524/104 |
| 4,622,092 A | 11/1986 | Bohannon, Jr. et al. | 156/461 |
| 4,623,501 A | 11/1986 | Ishizaki | 264/171 |
| 4,628,639 A | 12/1986 | Lownsdale | 49/498 |
| 4,644,898 A | 2/1987 | Jochem et al. | 118/405 |
| 4,649,856 A | 3/1987 | Shannon et al. | 118/712 |
| 4,651,672 A | 3/1987 | Sommer | 118/126 |
| 4,652,475 A | 3/1987 | Haney et al. | 428/36 |
| 4,654,262 A | 3/1987 | Alonso | 428/345 |
| 4,656,785 A | 4/1987 | Yackiw | 49/495 |
| 4,659,746 A | 4/1987 | Topcik | 521/89 |
| 4,660,147 A | 4/1987 | Allen, Jr. et al. | 364/468 |
| 4,668,319 A | 5/1987 | Piccoli | 156/149 |
| 4,680,317 A | 7/1987 | Kuhnel et al. | 521/89 |
| 4,683,166 A | 7/1987 | Yuto et al. | 428/314.8 |
| 4,687,137 A | 8/1987 | Boger et al. | 239/124 |
| 4,688,515 A | 8/1987 | Rosebrooks | 118/405 |
| 4,694,627 A | 9/1987 | Omholt | 52/390 |
| 4,695,236 A | 9/1987 | Predohl et al. | 425/131.1 |
| 4,707,172 A | 11/1987 | Sottini et al. | 65/3.11 |
| 4,708,351 A | 11/1987 | Midooka et al. | 277/184 |
| 4,719,039 A | 1/1988 | Leonardi | 252/511 |
| 4,721,591 A | 1/1988 | Cheng-Shiang | 264/54 |
| 4,722,818 A | 2/1988 | Zoller | 264/171 |
| 4,725,468 A | 2/1988 | McIntyre | 428/40 |
| 4,729,807 A | 3/1988 | Hede et al. | 156/172 |
| 4,730,416 A | 3/1988 | Eames | 49/493 |
| 4,735,169 A | 4/1988 | Cawston et al. | 118/411 |
| 4,738,810 A | 4/1988 | Cheng-Shiang | 264/54 |
| 4,742,646 A | 5/1988 | Kehrli | 49/479 |
| 4,746,477 A | 5/1988 | Wecker et al. | 264/45.5 |
| 4,746,545 A | 5/1988 | McIntyre | 427/176 |
| 4,756,271 A | 7/1988 | Maier | 118/411 |
| 4,767,183 A | 8/1988 | Martin | 350/96.23 |
| 4,774,109 A | 9/1988 | Hadzimihalis et al. | 427/286 |
| 4,778,367 A | 10/1988 | Hilakos | 425/113 |
| 4,805,554 A | 2/1989 | MacIntyre | 118/666 |
| 4,844,004 A | 7/1989 | Hadzimihalis et al. | 118/315 |
| 4,856,975 A | 8/1989 | Gearhart | 425/131.1 |
| 4,857,668 A | 8/1989 | Buonanno | 174/35 |
| 4,865,676 A | 9/1989 | Kimura et al. | 156/244.12 |
| 4,880,674 A | 11/1989 | Shimizu | 428/31 |
| 4,883,690 A | 11/1989 | Carter | 427/430.1 |

| | | | |
|---|---|---|---|
| 4,883,691 A | 11/1989 | McIntyre | 427/434.2 |
| 4,889,669 A | 12/1989 | Suzuki | 264/45.9 |
| 4,891,249 A | 1/1990 | McIntyre | 427/421 |
| 4,894,105 A | 1/1990 | Dyksterhouse et al. | 156/181 |
| 4,898,760 A | 2/1990 | Halberstadt et al. | 428/122 |
| 4,900,490 A | 2/1990 | Kozma | 264/54 |
| 4,907,741 A | 3/1990 | McIntyre | 239/124 |
| 4,916,863 A | 4/1990 | Burrous et al. | 49/419 |
| 4,918,111 A | 4/1990 | Tanaka et al. | 521/89 |
| 4,919,739 A | 4/1990 | Dyksterhouse et al. | 156/181 |
| 4,930,257 A | 6/1990 | Windgassen | 49/504 |
| 4,940,557 A | 7/1990 | Kimura | 264/26 |
| 4,943,472 A | 7/1990 | Dyksterhouse et al. | 428/240 |
| 4,968,854 A | 11/1990 | Benn, Sr. et al. | 174/35 GC |
| 4,984,533 A | 1/1991 | Takahashi et al. | 118/419 |
| 5,000,988 A | 3/1991 | Inoue et al. | 427/286 |
| 5,001,865 A | 3/1991 | Procton | 49/469 |
| 5,007,203 A | 4/1991 | Katrynuik | 49/493 |
| 5,009,947 A | 4/1991 | McManus et al. | 428/122 |
| 5,070,111 A | 12/1991 | Dumbauld | 521/82 |
| 5,075,139 A | 12/1991 | Crumbach et al. | 427/286 |
| 5,087,488 A | 2/1992 | Cakmakci | 428/31 |
| 5,094,792 A | 3/1992 | Baran | 264/171 |
| 5,128,198 A | 7/1992 | Dyksterhouse et al. | 428/240 |
| 5,156,715 A | 10/1992 | Starnes, Jr. | 156/500 |
| 5,160,541 A | 11/1992 | Fickling et al. | 118/405 |
| 5,169,449 A | 12/1992 | Raught | 118/404 |
| 5,186,279 A | 2/1993 | Chasteen et al. | 184/15.1 |
| 5,192,586 A | 3/1993 | Mertinooke et al. | 427/210 |
| 5,205,890 A | 4/1993 | Darsey et al. | 156/169 |
| 5,221,346 A | 6/1993 | Anderson | 118/405 |
| 5,237,383 A | 8/1993 | Parisi | 356/73.1 |
| 5,237,917 A | 8/1993 | Traut et al. | 101/35 |
| 5,251,809 A | 10/1993 | Drummond et al. | 229/202 |
| 5,266,019 A | 11/1993 | Farber | 425/113 |
| 5,271,794 A | 12/1993 | Jarrell et al. | 156/578 |
| 5,326,592 A | 7/1994 | Goewey et al. | 427/256 |
| 5,354,378 A | 10/1994 | Hauser et al. | 118/696 |
| 5,368,644 A | 11/1994 | Delgado | 118/405 |
| 5,382,401 A | 1/1995 | Pickett et al. | 264/177.16 |
| 5,393,796 A | 2/1995 | Halberstadt et al. | 521/134 |
| 5,409,733 A | 4/1995 | Boger et al. | 427/96 |
| 5,411,785 A | 5/1995 | Cook | 428/122 |
| 5,415,822 A | 5/1995 | Cook | 264/171 |
| 5,418,009 A | 5/1995 | Raterman et al. | 427/207.1 |
| 5,421,921 A | 6/1995 | Gill et al. | 156/62.4 |
| 5,423,935 A | 6/1995 | Benecke et al. | 156/291 |
| 5,429,840 A | 7/1995 | Raterman et al. | 427/256 |
| 5,449,408 A | 9/1995 | Koaizawa et al. | 118/405 |
| 5,451,355 A | 9/1995 | Boissonnat et al. | 264/136 |
| 5,458,291 A | 10/1995 | Brusko et al. | 239/423 |
| 5,512,601 A | 4/1996 | Halberstadt et al. | 521/79 |
| 5,516,545 A | 5/1996 | Sandock | 427/76 |
| 5,524,828 A | 6/1996 | Raterman et al. | 239/413 |
| 5,525,668 A | 6/1996 | Olivier | 524/504 |
| 5,533,675 A | 7/1996 | Benecke et al. | 239/413 |
| 5,538,380 A | 7/1996 | Norton et al. | 411/436 |
| 5,538,754 A | 7/1996 | Sandock | 427/96 |
| 5,571,326 A | 11/1996 | Boissonnat et al. | 118/405 |
| 5,573,638 A | 11/1996 | Lennon et al. | 162/123 |
| 5,574,118 A | 11/1996 | Olivier | 526/281 |
| 5,586,963 A | 12/1996 | Lennon et al. | 493/299 |
| 5,588,997 A | 12/1996 | Lysson et al. | 118/405 |
| 5,601,646 A | 2/1997 | Gardner et al. | 118/405 |
| 5,607,629 A | 3/1997 | DeMello et al. | 264/45.9 |
| 5,636,790 A | 6/1997 | Brusko et al. | 239/124 |
| 5,654,346 A | 8/1997 | Halberstadt et al. | 521/134 |
| 5,656,086 A | 8/1997 | Hultzsch et al. | 118/410 |
| 5,665,164 A | 9/1997 | Milliman | 118/420 |
| 5,683,036 A | 11/1997 | Benecke et al. | 239/413 |
| 5,685,911 A | 11/1997 | Raterman et al. | 118/669 |
| 5,686,165 A | 11/1997 | Cook | 428/122 |
| 5,700,845 A | 12/1997 | Chung et al. | 521/99 |
| 5,728,406 A | 3/1998 | Halberstadt et al. | 425/4 C |
| 5,728,430 A | 3/1998 | Sartor et al. | 427/356 |
| 5,728,911 A | 3/1998 | Hall | 585/508 |
| 5,733,608 A | 3/1998 | Kessel et al. | 427/547 |
| 5,788,889 A | 8/1998 | DeMello et al. | 264/45.9 |
| 5,795,516 A | 8/1998 | Cho et al. | 264/103 |
| 5,801,209 A | 9/1998 | Chung et al. | 521/99 |
| 5,802,948 A | 9/1998 | Andrisin, III et al. | 83/862 |
| 5,804,284 A | 9/1998 | Lennon et al. | 428/156 |
| 5,824,400 A | 10/1998 | Petrakis et al. | 428/218 |
| 5,843,230 A | 12/1998 | Potjer et al. | 118/407 |
| 5,843,231 A | 12/1998 | Spencer et al. | 118/420 |
| 5,851,566 A | 12/1998 | Potjer et al. | 425/225 |
| 5,875,555 A | 3/1999 | Andrisin, III et al. | 30/452 |
| 5,887,392 A | 3/1999 | Martin | 52/204.5 |
| 5,903,004 A | 5/1999 | Koshihara et al. | 250/310 |
| 5,907,004 A | 5/1999 | Dozeman et al. | 524/100 |
| 5,943,825 A | 8/1999 | Procton et al. | 49/469 |
| 5,962,075 A | 10/1999 | Sartor et al. | 427/356 |
| 5,968,854 A | 10/1999 | Akopian et al. | 442/132 |
| 5,995,693 A | 11/1999 | Yang et al. | 385/114 |
| 6,132,809 A | 10/2000 | Hynes et al. | 427/421 |

FOREIGN PATENT DOCUMENTS

| | | | |
|---|---|---|---|
| GB | 1467532 | 3/1977 | A44B/11/26 |
| GB | 1467534 | 3/1977 | B32B/1/00 |
| GB | 1507071 | 4/1978 | E06B/7/23 |
| GB | 1545511 | 5/1979 | |
| GB | 2067104 A | 7/1981 | C03C/25/02 |
| GB | 1595214 | 8/1981 | B05D/1/26 |
| GB | 2132509 A | 7/1984 | B05D/1/36 |
| GB | 2179270 A | 3/1987 | B05C/3/12 |
| GB | 2226965 | 7/1990 | B05C/5/02 |
| JP | 55-101438 | 8/1980 | B29F/3/10 |
| JP | 58-168544 | 10/1983 | B29H/7/00 |
| JP | S59-54535 | 3/1984 | |
| JP | 59-54535 | 3/1984 | |
| WO | WO98/58528 | 12/1998 | |

OTHER PUBLICATIONS

Levy, Sidney, Plastic Extrusion Technology Handbook, Industrial Press, NY, 1981.

Levy, Sidney, Handbook of Profile Coextrusion and Covering—Tooling and Systems Design, Construction, Operation, 1987.

Han, C. D. et al., "Studies on Wire Coating Extrusion. I. The Rheology of Wire Coating Extrusion", Polymer Engineering and Science, vol. 18, No. 13, pp. 1019–1029 (Oct. 1978).

Trexel Inc., "MUCELL™ Microcellular Extrusion Technology—Produce Lighter Weight Products Faster With A MuCell Extrusion License", 6 pages, (no date).

OMEGA Engineering Inc., Specification for the "OMEGA-LUX AH–66136 Process Air Heater", Online Catalogue: Electric Heater Products, [online], pp. J–15, J–16 [retrieved on Jan. 31, 2003]. Retrieved from the Internet:<URL: http://www.omega.com/toc_asp/frameset.html?book=Heaters&file=AHC_HEATER>.

OMEGA Engineering Inc., Specification for the "'T' Type air Process Heaters For In–Line Air and Gas Heating", Online Cataogue: Electric Heater Products, [online], pp. J–17, J–18 [retrieved on Jan. 31, 2003]. Retrieved from the Internet:<URL: http://www.omega.com/toc_asp/frameset.html?book=Heaters&file=AHP_SERIES>.

"Ultrafab's Extruded Components is Growing with Customer Demand," *ISC Today*, vol. 3, No. 3, 2 pgs., (no date).

Amesbury Group Inc., "Custom Molding on Demand", 17 pgs., (no date).

Amesbury Industries, "High–Performance Weatherseals for Window & Doors", 19 pgs., (no date).

Begin, Sherri, "AES Process Coextrudes EPDM, TPV", *Rubber and Plastics News*, 1 pg., (no date).

Boehringer Ingelheim, HYDROCEROL® Chemical Foaming and Nucleating Agents, 14 pgs., (no date).

Grelle, P.F. et al., "Ignition Resistant Polystyrene, A New Look at an Old Friend: The Cost Effective Alternative for the 90's", *Proceedings from Structural Plastics '91 Conference and New Product Design Competition*, pp. 145–155, (1991).

Harfmann Technology, Inc., Advertisement—"Carbon Dioxide/Nitrogen Metering Technology", 1 pg., (no date).

Ligon Brothers Manufacturing Company, "Metal & Plastic Stampings, Plastic Extrusions, Metal & Plastic Assemblies", 6 pgs, (1993).

Marketing information excerpt, *Fenestration*, p. 66 (Jan./Feb. 2001).

Marketing information excerpt, *Window & Door*™, p. 52 (Jun./Jul. 2000).

New England Urethane, Inc., Advertisement—"Corporate Profile", 1 pg., (no date).

New England Urethane, Inc., Advertisement—"On–Target Technology: Custom Compounding of Thermoplastic Elastomers", 2 pgs., (no date).

OMEGA Engineering Inc., Specification for "Low Flow Air Process and Liquid Circulation Heaters", Online Catalogue: Electric Heater Products, [online], p. J–20 [retrieved on Jan. 31, 2003]. Retrieved from the Internet:<URL: http://www.omega.com/toc_asp/frameset.html?book=Heaters&file=AHPF_HEATER>.

Patent Database Search Results: "DSM NV" in 1976–1999, with attached full text of U.S. Pat. No. 5,948,858, 10 pgs. (Oct. 1999).

Reedy International Corp., "SAFOAM® Product Selection: for Extrusion", 2 pgs., (no date).

Reedy International Corp., "SAFOAM® Product Selection: for Injection Molding,", 2 pgs., (no date).

Rogers, Tracy, "Weatherseals . . . Keeping Your Customers Warm and Dry," *Window and Door Fabricator*™, pp. 48, 50–51 (Oct./Nov. 1997).

Shaw, David, "New Machinery Suggests Rise in Automotive TPEs," *Rubber and Plastics News*, 1 pg., (no date).

Ultrafab, Inc., Advertisement—Ultra–Grip, USGlass, Metal and Glazing, 1 pg. (Mar. 2001).

Ultrafab, Inc., "A Complete Range of Pile Weatherseals and Extruded Profiles and Weatherseals", 2 pgs., (no date).

Ultrafab, Inc., Advertisement, 1 pg., (no date).

Ultrafab, Inc., Advertisement—The UltraCell Bulb (1 pg.), shown at WIN–DOOR 2000, Toronto Congress Center, Toronto, ON (Nov. 15–17, 2000).

Ultrafab, Inc., Advertisement—Ultra–Cell™ EPDM Foam–filled Bulb Seals, 1 pg., (no date).

"Foam Extrusion Technology for TP Elastomer" *Plastic Technology*, Feb. 1987, pp. 23 and 25.

Benning, C.J., "Plastic Foams: The Physics and Chemistry of Product Performance and Process Technology", *Volume II: Structure Properties and Applications*, 3 pages (1969).

Chart, "Resins and Compounds", *Modern Plastics Mid–October Encyclopedia Issue*, pp. 424–425 (1991).

Eaton, C.J., "Foam Extrusion" Primary Process, *Modern Plastics Mid–October Encyclopedia Issue*, vol. 67, No. 11, pp. 291–292 (1990).

Geelan, B.J., "Foaming Agents" Chemical & Additives, *Modern Plastics Mid–October Encyclopedia Issue*, vol. 67, No. 11, pp. 184–188 (1990).

Levy, Sidney, "Handbook of Profile Coextrusion and Covering—Tooling and System Design, Construction, Operations", pp. 1–64 (1987).

Levy, Sidney, P.E., "Handbook of Profile Extrusion—Tooling & System Design, Construction, Operation", pp. 1–109 (1987).

Levy, Sidney, P.E., "Plastic Extrusion Technology Handbook", pp. 178–183 (1981).

Levy, Sidney, P.E., "Plastic Extrusion Technology Handbook", pp. 189–201 (1989).

Monsanto Technical Correspondence, "Extrusion Foaming Technology for SANTOPRENE® Thermoplastic Rubber", *SANTOPRENE® Thermoplastic Rubber*, 18 pages (May 10, 1988).

Monsanto, "SANTOPRENE® Thermoplastic Rubber: Glazing and Sealing Applications" *SANTOPRENE® Thermoplastic Rubber*, 12 pages (1987).

Monsanto Technical Note, "SANTOPRENE® Thermoplastic Rubber: The Vulcanized Rubber that Processes as a Thermoplastic" *SANTOPRENE® Thermoplastic Rubber*, 12 pages (1985).

Monsanto Technical Paper, "Extrusion Foaming Technology for SANTOPRENE® Thermoplastic Rubber (Revised)", SANTOPRENE® *Thermoplastic Rubber*, 16 pages (May 13, 1987).

Monsanto, "Physical Properties", SANTOPRENE® *Thermoplastic Rubber*, 20 pages (1987).

Technology News, "Foam Extrusion Technology for TP Elastomer", *Plastics Technology*, p. 23 (Feb. 1987).

Walker, B.M. et al., *Handbook of Thermoplastic Elastomers—Second Edition*, 4 pages (1988).

Paulson Training Programs, Inc., "Extrusion Technology: Study Guide for Courses 2 & 3, Sessions 7–12", 4 pages (1988).

Michaeli, Walter, "Extrusion Dies for Plastics and Rubber, $2^{nd}$ rev. ed.", pp. 2–11, 157–159, 166–173, 178–181 (1992).

Bridge, Ralph, "Polymer Extrusion", [online], May 5, 1997, pp. 1–8 [retrieved on Jun. 14, 2001]. Retrieved from the Internet:<URL: http://www.engr.uconn.edu/cheg/polymer/c256hnp.htm>.

* cited by examiner

US 5,192,586 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 9, lines 43–54:

SANTOPRENE® having a durometer reading of 64 was foamed in accordance with the method detailed in the aforementioned commonly assigned co-pending application. A stiffener of polypropylene was bonded to the foam profile as shown in FIG. 1. A blend of 750 parts SANTOPRENE® 221-64, 250 parts SANTOPRENE® 223-50, 50 parts Ampacet, #10061, and 80 parts of a color additive was melted in a 1¼[Δ]″ extruder operated at 95 revolutions per minute and fed into a die of the type shown in FIGS. 2 and 3 with the die at 480° F. The foam-stiffener combination was pulled through the die at 50 feet per minute and subsequently cooled.

AS A RESULT OF REEXAMINATION, IT HAS BEEN DETERMINED THAT:

The patentability of claims 36, 39 and 40 is confirmed.

Claims 2–4, 14, 18–20 and 25–27 are cancelled.

Claims 1, 5, 17, 21, 24, 28, 31, 32, 37 and 38 are determined to be patentable as amended.

Claims 6–13, 15–16, 22, 23, 29, 30 and 33–35, dependent on an amended claim, are determined to be patentable.

New claims 41–107 are added and determined to be patentable.

1. A method of applying a coating to a *weatherseal comprising a solid* substrate *having a shape, said substrate comprising a non-rigid compressible foam profile for sealing and a rigid stiffener for attaching said weatherseal to a structure to be sealed, the method* utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said method comprising the steps of:

introducing a resin in a liquid state into said resin channel at a predetermined pressure;

maintaining the liquid resin within a first pressure range in said resin channel;

metering the liquid resin from said resin channel to said die opening through said metering gap so as to bring the liquid resin from the first pressure range to a second pressure range, the pressures in the second pressure range being generally lower than the pressures in the first pressure range;

passing said substrate through said die opening; and applying the liquid resin at a pressure within the second pressure range to *compress and coat at least a portion of said non-rigid compressible foam profile of* said substrate as said substrate passes through said die opening.

5. The method according to claim [4] *1* wherein said rigid [portion] *stiffener* comprises polypropylene and said non-rigid [portion] *profile* comprises a thermoplastic elastomeric foam.

17. A method of providing an outer layer for a *weatherseal comprising a solid* substrate *having a shape, said substrate comprising a non-rigid compressible foam profile for sealing and a rigid stiffener for attaching said weatherseal to a structure to be sealed, the method* utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate throught the die opening of said second die;

applying a second resin in a liquid state to at least a second selected portion of said substrate distinct from said at least first selected portion by metering the second liquid resin from the resin channel of said second die opening of said second die through the metering gap of said second die, the second liquid resin being applied to said substrate as said substrate passes through the die opening of said second die; and doctoring the second liquid resin coated substrate to configure a second outer layer component at said at least second selected portion of said substrate, *wherein at least one of said first selected portion and said second selected portion comprises at least a portion of said non-rigid compressible foam profile and at least one applying step compresses and coats at least a portion of said non-rigid compressible foam profile of said substrate.*

21. The method according to claim [20] *17* wherein said non-rigid [portion] *profile* comprises [a] foam and said rigid [portion] *stiffener* comprises polypropylene.

24. A method of providing an outer layer for a *weatherseal comprising a solid* substrate *having a shape, said substrate comprising a non-rigid compressible foam profile for sealing and a rigid stiffener for attaching said weatherseal to a structure to be sealed, the method* utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said outer layer comprising at least a first and a second component of different materials, the method comprising the steps of:

passing said substrate throught the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate by metering the second liquid resin from the resin channel of said second die to the die opening of said second die through the metering gap of said second die, the second liquid resin being applied to said substrate as said substrate passes through the die opening of said second die, said second selected portion overlaying at least part of said first selected portion; *and* doctoring the second liquid coated substrate to configure a second outer layer component at said at least second selected portion of said substrate, *wherein at least one of said first selected portion and said second selected portion comprises at least a portion of said non-rigid compressible foam profile and at least one applying step compresses and coats at least a portion of said non-rigid compressible foam profile of said substrate.*

28. The method according to claim [27] *24* wherein said non-rigid [substrate] *profile* comprises [a] foam and said rigid [substrate] *stiffener* comprises polypropylene.

31. A method of applying a coating to a *weatherseal comprising a solid* substrate *having a shape, said substrate comprising a non-rigid compressible foam profile for sealing and a rigid stiffener for attaching said weatherseal to a structure to be sealed, the method* utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said method comprising the steps of:

introducing a resin in the liquid state into said resin channel;

metering the liquid resin from said resin channel to said die opening through said metering gap;

passing said substrate through said die opening; and applying the liquid resin to *compress and coat at least a portion of said non-rigid compressible foam profile of* said substrate as said substrate passes through said die opening.

32. A die *adapted* for coating a *weatherseal comprising a solid* substrate *having a shape, said substrate comprising a non-rigid compressible foam profile for sealing and a rigid stiffener for attaching said weatherseal to a structure to be sealed,* said die comprising:

a die plate;

a face plate coupled to said die plate so as to define a resin channel therein for maintaining a resin in a liquid state within a first pressure range;

a die opening in said die plate and said face plate for passing said substrate therethrough; and a wall disposed between said resin channel and said die opening so as to form a metering gap between a top of said wall and said face plate for metering the liquid resin from said resin channel to said die opening so as to bring the liquid resin from the first pressure range to a second pressure range in order to coat *at least a portion of said non-rigid compressible foam profile of* said substrate *by compressing said portion of said foam profile* with the liquid resin, the pressures in the second pressure range generally being lower than the pressures in the first pressure range.

37. A die *adapted* for coating a *weatherseal comprising a solid* substrate *having a shape, said substrate comprising a non-rigid compressible foam profile for sealing and a rigid stiffener for attaching said weatherseal to a structure to be sealed,* said die comprising:

a die plate;

a face plate coupled to said die plate so as to define a resin channel therein for containing a resin in a liquid state;

a die opening formed in said die plate and said face plate for passing said substrate therethrough; and a wall disposed between said resin channel and said die opening so as to form a metering gap between a top of said wall and said face plate for metering the liquid resin from said resin channel to said die opening in order to coat *at least a portion of said non-rigid compressible foam profile of* said substrate *by compressing said portion of said foam profile* with the liquid resin.

38. An apparatus *adapted* for providing an outer layer for a *weatherseal comprising a solid* substrate *having a shape, said substrate comprising a non-rigid compressible foam profile for sealing and a rigid stiffener for attaching said weatherseal to a structure to be sealed,* said outer layer comprising at least a first and a second component of different materials, said apparatus including first and second dies supplied with first and second liquid resins, respectively, each die comprising a die plate, a face plate coupled to said die plate so as to define a resin channel therein for maintaining a resin in the liquid state, a die opening formed in said die plate and said face plate for passing said substrate therethrough, a wall disposed between said resin channel and said die opening so as to form a metering gap between a top of said wall and said face plate for metering liquid resin from said resin channel to said die opening, said first die arranged to apply the first liquid resin to at least a first selected portion of said substrate and said second die arranged to apply the second liquid resin to at least a second selected portion of said substrate, wherein said first and said second selected portions at least partially overlap *and wherein at least one of said first selected portion and said second selected portion comprises at least a portion of said non-rigid compressible foam profile and at least one applying step compresses and coats at least a portion of said non-rigid compressible foam profile of said substrate.*

*41. A method of applying a coating to a substrate utilizing a die including a die plate, a face plate coupled to said die* plate so as to define a resin channel therein, a die opening formed in said die plate and said face plate for passing said substrate therethrough, and a wall disposed between said resin channel and said die opening so as to form a metering gap between a top of said wall and said face plate, wherein the wall comprises a ridge on an inner side thereof to form a pocket, said method comprising the steps of:

introducing a resin in a liquid state into said resin channel at a predetermined pressure;

maintaining the liquid resin within a first pressure range in said resin channel;

metering the liquid resin from said resin channel to said die opening through said metering gap so as to bring the liquid resin from the first pressure range to a second pressure range, the pressures in the second pressure range being generally lower than the pressures in the first pressure range;

passing said substrate through said die opening; and applying the liquid resin at a pressure within the second pressure range to said substrate as said substrate passes through said die opening.

42. A method of providing an outer layer for a substrate utilitizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, wherein at least one wall comprises a ridge on an inner side thereof to form a pocket, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate distinct from said at least first selected portion by metering the second liquid resin from the resin channel of said second die to the die opening of said second die through the metering gap of said second die, the second liquid resin being applied to said substrate as said substrate passes through the die opening of said second die; and doctoring the second liquid resin coated substrate to configure a second outer layer component at said at least second selected portion of said substrate.

43. A method of applying a coating to a substrate utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said method comprising the steps of:

introducing a resin in a liquid state into said resin channel at a predetermined pressure;

maintaining the liquid resin within a first pressure range in said resin channel;

metering the liquid resin from said resin channel to said die opening through said metering gap so as to bring the liquid resin from the first pressure range to a second pressure range, the pressures in the second pressure range being generally lower than the pressures in the first pressure range;

passing said substrate through said die opening; and applying the liquid resin at a pressure within the second pressure range to said substrate as said substrate passes through said die opening, wherein the liquid resin is applied to said substrate so as to produce an outer layer having low orientation.

44. The method according to claim 43 wherein said substrate comprises a rigid substrate.

45. The method according to claim 43 wherein said substrate comprises a non-rigid substrate.

46. The method according to claim 43 wherein said substrate comprises both non-rigid and rigid portions.

47. The method according to claim 46 wherein said rigid portion comprises polypropylene and said non-rigid portion comprises a thermoplastic elastomeric foam.

48. The method according to claim 47 wherein said liquid resin comprises a melted thermoplastic elastomer.

49. The method according to claim 43 wherein said liquid resin comprises a melted thermoplastic elastomer.

50. The method according to claim 43 wherein said liquid resin comprises a latex emulsion.

51. The method according to claim 43 wherein said liquid resin comprises a melted resin.

52. The method according to claim 51 wherein said melted resin comprises at least one melted thermoplastic resin selected from the group consisting of ethylene/methacrylic acid copolymer, ethylene/ethyl acrylate polymer, linear low density polyethylene polymers and copolymerizations therewith, ethylene interpolymer/chlorinated polyolefin blends, ionomers, polypropylene copolymers, polyethylene copolymers, nylon, polyesters, and polyurethane.

53. The method according to claim 43 wherein the liquid resin is metered from said resin channel to said die opening so as to coat only predetermined portions of said substrate.

54. The method according to claim 43 wherein the liquid resin is metered from said resin channel to said die opening so as to coat said substrate with varying predetermined thicknesses of said liquid resin.

55. The method according to claim 43 wherein the pressures within the second pressure range are approximately atmospheric pressure.

56. The method according to claim 43 further comprising the step of:

doctoring the liquid resin coated substrate to configure an outer layer for said substrate.

57. The method according to claim 43 wherein said metering gap is in a range of about 0.00 to about 0.2 inches.

58. A method of providing an outer layer for a substrate utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate disctinct from said at least first selected portion by metering the second liquid resin from the resin channel of said second die to the die opening of said second die through the metering gap of said second die, the second liquid resin being applied to said substrate as said substrate passes through the die opening of said second die; and doctoring the second liquid resin coated substrate to configure a second outer layer component at said at least second selected portion of said substrate, wherein at least one of the first liquid resin and the second liquid resin is applied to the substrate so as to produce an outer layer having low orientation.

59. The method according to claim 58 wherein said substrate comprises a rigid substrate.

60. The method according to claim 58 wherein said substrate comprises a non-rigid substrate.

61. The method according to claim 58 wherein said substrate comprises a non-rigid portion and a rigid portion.

62. The method according to claim 61 wherein said non-rigid portion comprises a foam and said rigid portion comprises polypropylene.

63. The method according to claim 62 wherein at least one of said first outer layer component and said second outer layer component comprises a low friction layer.

64. The method according to claim 62 wherein one of said first and said second outer layer components comprises a thermoplastic elastomer and the other of said first and said second outer layer components comprises a lower friction layer.

65. A method of providing an outer layer for a substrate utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate by metering the second liquid resin from the resin channel of said second die to the die opening of said second die through the metering gap of said second die, the second liquid resin being applied to said substrate as said substrate passes through the die opening of said second die, said second selected portion overlaying at least part of said first selected portion; and doctoring the second liquid coated substrate to configure a second outer layer component at said at least second selected portion of said substrate, wherein at least one of the first liquid resin and the second liquid resin is applied to the substrate so as to produce an outer layer having low orientation.

66. The method according to claim 65 wherein said substrate comprises a rigid substrate.

67. The method according to claim 65 wherein said substrate comprises a non-rigid substrate.

68. The method according to claim 65 wherein said substrate comprises a non-rigid substrate and a rigid substrate.

69. The method according to claim 68 wherein said non-rigid substrate comprises a foam and said rigid substrate comprises polypropylene.

70. The method according to claim 69 wherein said second outer layer component comprises a low friction layer.

71. The method according to claim 69 wherein said first outer layer component comprises a thermoplastic elastomer and said second outer layer component comprises a lower friction layer.

72. A method of applying a coating to a substrate utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, said method comprising the steps of:

introducing a resin in the liquid state into said resin channel;

metering the liquid resin from said resin channel to said die opening through said metering gap;

passing said substrate through said die opening; and applying the liquid resin to said substrate as said substrate passes through said die opening, so as to produce an outer layer having low orientation.

73. A method of applying a coating to a substrate utilizing a die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, wherein the wall comprises a ridge on an inner side thereof to form a pocket, said method comprising the steps of:

introducing a resin in the liquid state into said resin channel;

metering the liquid resin from said resin channel to said die opening through said metering gap;

passing said substrate through said die opening; and applying the liquid resin to said substrate as said substrate passes through said die opening.

74. A method of providing an outer layer for a substrate utilizing first and second dies, each die including a die plate, a face plate coupled to said die plate so as to define a resin channel therein, a die opening formed in said die plate and said face plate for passing said substrate therethrough, and a wall disposed between said resin channel and said die opening so as to form a metering gap between a top of said wall and said face plate, wherein at least one wall comprises a ridge on an inner side thereof to form a pocket, said outer layer comprising at least a first and a second component of different materials, the method comprising the steps of:

passing said substrate through the die opening of said first die;

applying a first resin in a liquid state to at least a first selected portion of said substrate by metering the first liquid resin from the resin channel of said first die to the die opening of said first die through the metering gap of said first die, the first liquid resin being applied to said substrate as said substrate passes through the die opening of said first die;

doctoring the first liquid resin coated substrate to configure a first outer layer component at said at least first selected portion of said substrate;

passing said substrate through the die opening of said second die;

applying a second resin in a liquid state to at least a second selected portion of said substrate by metering the second liquid resin from the resin channel of said second die to the die opening of said second die through the metering gap of said second die, the second liquid resin being applied to said substrate as said substrate passes through the die opening of said second die, said second selected portion overlaying at least part of said first selected portion; and doctoring the second liquid coated substrate to configure a second outer layer component at said at least second selected portion of said substrate.

75. The method according to claim 1 or 31, wherein the face plate forms a flow channel.

76. The method according to claim 1 or 31, wherein the wall comprises a variable height to vary a thickness of the metering gap.

77. The method according to claim 17 or 24, wherein at least one face plate forms a flow channel.

78. The method according to claim 17 or 24, wherein at least one wall comprises a variable height to vary a thickness of the corresponding metering gap.

79. The method according to claim 43 or 72, wherein the wall comprises a ridge on an inner side thereof to form a pocket.

80. The method according to claim 43 or 72, wherein the face plate forms a flow channel.

81. The method according to claim 43 or 72, wherein the wall comprises a variable height to vary a thickness of the metering gap.

82. The method according to claim 58 or 65, wherein at least one wall comprises a ridge on an inner side thereof to form a pocket.

83. The method according to claim 58 or 65, wherein at least one face plate forms a flow channel.

84. The method according to claim 58 or 65, wherein at least one wall comprises a variable height to vary a thickness of the corresponding metering gap.

85. A die for coating a substrate, said die comprising:

a die plate;

a face plate coupled to said die plate so as to define a resin channel therein for maintaining a resin in a liquid state within a first pressure range;

a die opening in said die plate and said face plate for passing said substrate therethrough; and a wall disposed between said resin channel and said die opening so as to form a metering gap between a top of said wall and said face plate for metering the liquid resin from said resin channel to said die opening so as to bring the liquid resin from the first pressure range to a second pressure range in order to coat said substrate with the liquid resin to produce an outer layer having low orientation, the pressures in the second pressure range generally being lower than the pressures in the first pressure range.

86. The die according to claim 85 wherein said wall meters the liquid resin so as to coat only predetermined portions of said substrate.

87. The die according to claim 86 wherein said wall meters the liquid resin so as to coat said substrate with varying predetermined thicknesses of the liquid resin.

88. The die according to claim 85 wherein said metering gap is in a range of about 0.00 to about 0.2 inches.

89. A die for coating a substrate, said die comprising:

a die plate;

a face plate coupled to said die plate so as to define a resin channel therein for containing a resin in a liquid state;

a die opening formed in said die plate and said face plate for passing said substrate therethrough; and a wall disposed between said resin channel and said die opening so as to form a metering gap between a top of said wall and said face plate for metering the liquid resin from said resin channel to said die opening in order to coat said substrate with the liquid resin to produce an outer layer having low orientation.

90. An apparatus for providing an outer layer for a substrate, said outer layer comprising at least a first and a second component of different materials, said apparatus including first and second dies supplied with first and second liquid resins, respectively, each die comprising a die plate, a face plate coupled to said die plate so as to define a resin channel therein for maintaining a resin in the liquid state, a die opening formed in said die plate and said face plate for passing said substrate therethrough, a wall disposed between said resin channel and said die opening so as to form a metering gap between a top of said wall and said face plate for metering liquid resin from said resin channel to said die opening, said first die arranged to apply the first liquid resin to at least a first selected portion of said substrate and said second die arranged to apply the second liquid resin to at least a second selected portion of said substrate to produce an outer layer having low orientation, wherein said first and said second selected portions at least partially overlap.

91. The apparatus according to claim 90, wherein at least one wall comprises a ridge on an inner side thereof to form a pocket.

92. The apparatus according to claim 90, wherein at least one face plate forms a flow channel.

93. The apparatus according to claim 90, wherein at least one wall comprises a variable height to vary a thickness of the corresponding metering gap.

94. An apparatus for providing an outer layer for a substrate, said outer layer comprising at least a first and a second component of different materials, said apparatus including first and second dies supplied with first and second liquid resins, respectively, each die comprising a die plate, a face plate coupled to said die plate so as to define a resin channel therein for maintaining a resin in the liquid state, a die opening formed in said die plate and said face plate for passing said substrate therethrough, a wall disposed between said resin channel and said die opening so as to form a metering gap between a top of said wall and said face plate for metering liquid resin from said resin channel to said die opening, wherein at least one wall comprises a ridge on an inner side thereof to form a pocket, said first die arranged to apply the first liquid resin to at least a first selected portion of said substrate and said second die arranged to apply the second liquid resin to at least a second selected portion of said substrate, wherein said first and said second selected portions at least partially overlap.

95. A die for coating a substrate, said die comprising:
a die plate;
a face plate coupled to said die plate so as to define a resin channel therein for maintaining a resin in a liquid state within a first pressure range;
a die opening in said die plate and said face plate for passing said substrate therethrough; and
a wall comprising a ridge on an inner side thereof to form a pocket, the wall disposed between said resin channel and said die opening so as to form a metering gap between a top of said wall and said face plate for metering the liquid resin from said resin channel to said die opening so as to bring the liquid resin from the first pressure range to a second pressure range in order to coat said substrate with the liquid resin, the pressures in the second pressure range generally being lower than the pressures in the first pressure range.

96. A die for coating a substrate, said die comprising:
a die plate;
a face plate coupled to said die plate so as to define a resin channel therein for containing a resin in a liquid state;
a die opening formed in said die plate and said face plate for passing said substrate therethrough; and
a wall comprising a ridge on an inner side thereof to form a pocket, the wall disposed between said resin channel and said die opening so as to form a metering gap between a top of said wall and said face plate for metering the liquid resin from said resin channel to said die opening in order to coat said substrate with the liquid resin.

97. The apparatus according to claim 38, wherein at least one face plate forms a flow channel.

98. The apparatus according to claim 38, wherein at least one wall comprises a variable height to vary a thickness of the corresponding metering gap.

99. The die according to claim 32 or 37, wherein the face plate forms a flow channel.

100. The die according to claim 32 or 37, wherein the wall comprises a variable height to vary a thickness of the metering gap.

101. The die according to claim 36 or 39, wherein the wall comprises a ridge on an inner side thereof to form a pocket.

102. The die according to claim 36 or 39, wherein the face plate forms a flow channel.

103. The die according to claim 36 or 39, wherein the wall comprises a variable height to vary a thickness of the metering gap.

104. The die according to claim 36 or 39, wherein at least one of the first and second liquid resins is applied to said substrate so as to produce an outer layer having low orientation.

105. The die according to claim 85 or 89, wherein the wall comprises a ridge on an inner side thereof to form a pocket.

106. The die according to claim 85 or 89, wherein the face plate forms a flow channel.

107. The die according to claim 85 or 89, wherein the wall comprises a variable height to vary a thickness of the metering gap.

* * * * *